US012595159B2

(12) United States Patent
Sanor et al.

(10) Patent No.: US 12,595,159 B2
(45) Date of Patent: Apr. 7, 2026

(54) APPARATUS AND METHOD FOR REBUILDING A SPREADER BEAM

(71) Applicant: Steel Equipment Specialists LLC, Alliance, OH (US)

(72) Inventors: John W. Sanor, Kensington, OH (US); William Jacob Eyer, IV, Minerva, OH (US); David D. Gingerich, Massillon, OH (US); David J. Render, Alliance, OH (US)

(73) Assignee: Steel Equipment Specialists LLC, Alliance, OH (US)

( * ) Notice: Subject to any disclaimer, the term of this patent is extended or adjusted under 35 U.S.C. 154(b) by 0 days.

(21) Appl. No.: 18/891,968

(22) Filed: Sep. 20, 2024

(65) Prior Publication Data

US 2025/0282009 A1 Sep. 11, 2025

Related U.S. Application Data

(60) Provisional application No. 63/561,804, filed on Mar. 6, 2024.

(51) Int. Cl.
*B23P 6/00* (2006.01)
*B66C 1/12* (2006.01)
*B66C 1/66* (2006.01)
*B66C 13/06* (2006.01)

(52) U.S. Cl.
CPC ................ *B66C 1/663* (2013.01); *B23P 6/00* (2013.01); *B66C 1/125* (2013.01); *B66C 13/06* (2013.01)

(58) Field of Classification Search
CPC .............. B23P 6/00; B23P 6/04; B66C 13/06
See application file for complete search history.

(56) References Cited

U.S. PATENT DOCUMENTS

2019/0127187 A1* 5/2019 Klapper .................. B66C 13/06

* cited by examiner

*Primary Examiner* — Christopher J. Besler
(74) *Attorney, Agent, or Firm* — Sand, Sebolt & Wernow Co., LPA

(57) ABSTRACT

A spreader beam and related method provide a simplified repair or rebuilding capability for wear parts of the spreader beam. The disclosed spreader beam includes removable sheave nests containing sheaves, which are the wear parts in a spreader beam. The disclosed spreader beam saves time and costs since an entire spreader beam need not be transported to a repair shop, rather only the removable sheave nests, or only the sheaves. In one embodiment, sheaves and sheave nests may be removed and replaced without the need for unwinding supporting cables.

12 Claims, 34 Drawing Sheets

FIG. 18B

APPARATUS AND METHOD FOR REBUILDING A SPREADER BEAM

RELATED APPLICATIONS

This application claims priority to U.S. provisional application No. 63/561,804 filed 6 Mar. 2024, the entirety of which is incorporated herein by reference.

TECHNICAL FIELD

This disclosure is generally directed to a spreader beam. More particularly, this disclosure is directed to a spreader beam with separable sheaves. Even more particularly, this disclosure is directed to a method of rebuilding, repairing or reconditioning a spreader beam.

BACKGROUND ART

Spreader beams are used in various applications, including foundries where molten iron or other metals are poured, for example, into sand molds. Other types of loads may also be borne by a spreader beam. A ladle or other load is held by the spreader beam, which in turn is lifted by a crane. The spreader beam includes at least two pullies also known as sheaves, or pluralities of sheaves, at opposite ends of an elongate beam. Cables or wire rope connect the sheaves to the crane.

The sheaves are wear parts that must be periodically repaired or replaced. Known spreader beams include sheaves that are integrally fastened to the elongate beam. In order to rebuild or repair the sheaves, the entire spreader beam, including the sheaves, must be transported to a repair shop. Cables must be unwound and removed. A typical spreader beam may weigh in excess of ten tons, thereby incurring significant transport cost.

SUMMARY OF THE INVENTION

The disclosed spreader beam provides a simplified repair or rebuilding capability for wear parts thereof. In particular, the spreader beam of the invention, because it includes removable sheave nests, can be rebuilt or repaired at lower cost. This is because only the sheave nests, and not the entire spreader beam (having integral sheaves) need to be shipped to a repair shop.

In one aspect, an exemplary embodiment of the present disclosure may provide a spreader beam comprising: a main frame adapted to suspend a load of material; and at least one sheave nest removably engaged with the main frame. In this exemplary embodiment or another exemplary embodiment, the spreader beam further comprises: at least one receiver operatively engaged with the main frame and configured to receive the at least one sheave nest. In this exemplary embodiment or another exemplary embodiment, the at least one receiver comprises: at least one side wall operatively engaged with the main frame; and at least one cradle plate operatively engaged with the at least one side wall, wherein the at least one cradle plate is configured to receive the at least one sheave nest. In this exemplary embodiment or another exemplary embodiment, the at least one receiver further comprises: a lower receiver aperture defined in the at least one side wall. In this exemplary embodiment or another exemplary embodiment, the at least one sheave nest comprises: at least one nest flange; at least one nest plate; a lower sheave nest aperture defined in at least one of the at least one nest flange and the at least one nest plate; and at least one sheave rotatably engaged with at least one of the at least one nest flange and the at least one nest plate. In this exemplary embodiment or another exemplary embodiment, the lower sheave nest aperture of the at least one sheave nest is coaxial with said lower receiver aperture of the at least one receiver when the at least one sheave nest is engaged with the at least one receiver. In this exemplary embodiment or another exemplary embodiment, the spreader beam further comprises: at least one lower securement assembly operatively engageable with the at least one sheave nest at the at least one lower sheave nest aperture and with the at least one receiver at the lower receiver aperture. In this exemplary embodiment or another exemplary embodiment, the at least one sheave nest further comprises: at least one nest plate operatively engaged with the at least one nest flange; at least one upper sheave nest aperture defined by at least one of the at least one nest flange and the at least one nest plate. In this exemplary embodiment or another exemplary embodiment, the at least one receiver further comprises: at least another side wall operatively engaged with the main frame and opposite to the at least one side wall; and an upper receiver aperture defined in at least one of the at least one side wall and the at least another side wall. In this exemplary embodiment or another exemplary embodiment, the upper receiver aperture is coaxial with the at least one upper sheave nest aperture when the at least one sheave nest is engaged with the at least one receiver. In this exemplary embodiment or another exemplary embodiment, the spreader beam further comprises: an upper securement assembly operatively engaged with the at least one sheave nest at the at least one upper sheave nest aperture and with the at least one receiver at the upper receiver aperture. In this exemplary embodiment, the at least one receiver further comprises: a cover plate covering an access port where at least a portion of the at least one lower securement assembly is accessible.

In another aspect, the invention provides a method of repairing a spreader beam, comprising: providing the spreader beam, wherein the spreader beam comprises: a main frame adapted to suspend a load of material; a first receiver operatively engaged with the main frame; a second receiver operatively engaged with the main frame; a first sheave nest removably engaged with the first receiver; a second sheave nest removably engaged with the second receiver; a third sheave nest; separating at least the first sheave nest from the first receiver; and installing a third sheave nest with the first receiver. In this exemplary embodiment or another exemplary embodiment, the third sheave nest may be different from the first sheave nest or the second sheave nest, or may be the first sheave nest or the second sheave nest that has been rebuilt or repaired. In this exemplary embodiment or another exemplary embodiment, the step of separating at least the first sheave from the first receiver further comprises: removing at least one securement assembly from at least the first sheave nest and the first receiver. In this exemplary embodiment or another exemplary embodiment, the method of repairing a spreader beam further comprises: removing a cover plate from the first receiver; revealing an access port defined in the first receiver; and accessing at least a portion of the at least one securement assembly inside a chamber defined in the first receiver through the access port. In this exemplary embodiment or another exemplary embodiment, the step of removing the at least one securement assembly further comprises: disengaging at least one fastener from an end cap of the at least one securement assembly; disengaging the at least one fastener from a pin of the at least one securement assembly; and separating the end cap from the pin. In this exemplary embodiment or another exemplary embodiment, the step of removing the at least one securement assembly further comprises: removing the pin from the first sheave nest and the first receiver. In this exemplary embodiment or another exemplary embodiment, the step of separating the first sheave nest further comprises: removing at least another securement assembly from the at least the first sheave nest and the first receiver, wherein the at least one another securement assembly is spaced apart from the at least one securement assembly. In this exemplary embodiment or another exemplary embodiment, the step of installing the third sheave nest with the first receiver further comprises: resting the third sheave nest with the first receiver; and engaging the third sheave nest to at least the first receiver with at least one securement assembly. In this exemplary embodiment or another exemplary embodiment, the fourth sheave nest may be different from the first sheave nest or the second sheave nest, or it may be the first sheave nest or the second sheave nest that has been rebuilt or repaired. In this exemplary embodiment or another exemplary embodiment, the method of repairing a spreader beam further comprises: separating the second sheave nest from the second receiver; and installing a fourth sheave nest with the second receiver. In another aspect, an exemplary embodiment of the present disclosure may provide a sheave nest comprising at least plurality of nest plates interspersed with a plurality of sheaves rotatably mounted to the plurality of nest plates. In another aspect, an exemplary embodiment of the present disclosure may provide a sheave nest comprising at least one nest flange; at least one nest plate; a lower sheave nest aperture defined in at least one of the at least one nest flange and the at least one nest plate; and at least one sheave rotatably engaged with at least one of the at least one nest flange and the at least one nest plate. In this exemplary embodiment or another exemplary embodiment, a sheave nest may be rebuilt or repaired by removing and replacing at least one sheave. In this exemplary embodiment or another exemplary embodiment, the step of removing at least one sheave further comprises loosening and removing at least one axle bolt from the axle. In this exemplary embodiment or another exemplary embodiment, the axle is removed from the sheave nest by pulling on the axle cap.

In yet another aspect, the disclosure provides a method of reconditioning a spreader beam, comprising: disassembling the spreader beam; maintaining an arcuate orientation of a plurality of suspension cables, wherein the plurality of suspension cables is engaged with a first plurality of sheaves of the spreader beam; removing the first plurality of sheaves from the plurality of suspension cables; replacing the first plurality of sheaves with a second plurality of sheaves, wherein the second plurality of sheaves are different from the first plurality of sheaves. In this exemplary embodiment or another exemplary embodiment, the method further comprises: installing the plurality of suspension cables into the second plurality of sheaves; and reassembling the spreader beam with the second plurality of sheaves. In this exemplary embodiment or another exemplary embodiment, maintaining the arcuate orientation of the at least one plurality of suspension cables further comprises: installing at least one clamp to the plurality of suspension cables at a distance away from the first plurality of sheaves. In this exemplary embodiment or another exemplary embodiment, In this exemplary embodiment or another exemplary embodiment, the method further comprises: installing the plurality of suspension cables into the second plurality of sheaves; removing the at least one clamp from the plurality of suspension cables; and reassembling the spreader beam with the second plurality of sheaves. In this exemplary embodiment or another exemplary embodiment, method further comprises: disassembling the first plurality of sheaves of the spreader beam from a sheave nest. In this exemplary embodiment or another exemplary embodiment, the method further comprises: disassembling a sheave nest of a spreader beam from a main frame of the spreader beam; and disassembling the first plurality of sheaves of the spreader beam from the sheave nest. In this exemplary embodiment or another exemplary embodiment, the method further comprises: securing a plurality of restraints to the main frame; and stabilizing the main frame, by the plurality of restraints, as the first and second sheave nests are separated from the main frame. In this exemplary embodiment or another exemplary embodiment, the method further comprises: removing at least a first securement assembly from the sheave nest and a receiver of the spreader beam; and removing at least a second securement assembly from the sheave nest and the receiver. In this exemplary embodiment or another exemplary embodiment, the method further comprises: removing an axle from the sheave nest and the receiver; and separating the sheave nest from the receiver. In this exemplary embodiment or another exemplary embodiment, the method further comprises: removing a cover plate from the receiver; revealing an access port defined in the receiver; and accessing at least a portion of the at least the first securement assembly inside a chamber defined in the receiver through the access port. In this exemplary embodiment or another exemplary embodiment, the method further comprises: disengaging at least one fastener from an end cap of the at least the first securement assembly; disengaging the at least one fastener from a pin of the at least the first securement assembly; and separating the end cap from the pin. In this exemplary embodiment or another exemplary embodiment, the method further comprises: removing the pin from a first sheave nest and a first receiver. In this exemplary embodiment or another exemplary embodiment, the method further comprises: removing at least a second securement assembly from at least the first sheave nest and the first receiver. In this exemplary embodiment or another exemplary embodiment, the further comprises: disengaging at least one fastener from an end cap of the at least the first securement assembly; disengaging the at least one fastener from a pin of the at least the first securement assembly; and separating the end cap from the pin.

In another aspect, the present disclosure provides a method of reconditioning a spreader beam, comprising: maintaining an arcuate orientation of a first plurality of suspension cables wherein the first plurality of suspension cables is engaged with a first plurality of sheaves of the spreader beam; maintaining an arcuate orientation of a second plurality of suspension cables wherein the second plurality of suspension cables is engaged with a second plurality of sheaves of the spreader beam; disassembling the spreader beam; and removing the first and second pluralities of sheaves from the first and second pluralities of suspension cables. In this exemplary embodiment or another exemplary embodiment, the method further comprises: stabilizing the main frame, by a plurality of restraints, as the first and second sheave nests are separated from the main frame. In this exemplary embodiment or another exemplary embodiment, the method further comprises the step of maintaining the arcuate orientation of a first plurality of suspension cables further comprises: engaging a first clamp to the first plurality of suspension cables, wherein each suspension cable of the first plurality of suspension cables is spaced apart from one another; wherein the step of maintaining the arcuate and orientation of the second plurality of suspension cables further comprises: engaging a second clamp to the second plurality of suspension cables, wherein each suspension cable of the second plurality of suspension cables is spaced apart from one another. In this exemplary embodiment or another exemplary embodiment, the method further comprises: replacing the first plurality of sheaves with a third plurality of sheaves, wherein the third plurality of sheaves are different from the first plurality of sheaves; and replacing the second plurality of sheaves with a fourth plurality of sheaves, wherein the fourth plurality of sheaves are different from the second plurality of sheaves. In this exemplary embodiment or another exemplary embodiment, the method further comprises: replacing a first sheave nest with a third sheave nest wherein the third sheave nest is different from the first sheave nest; and replacing a second sheave nest with a fourth sheave nest wherein the fourth sheave nest is different from the second sheave nest. In this exemplary embodiment or another exemplary embodiment, the method further comprises: securing the third sheave nest to a first receiver using at least a first securement assembly and securing the fourth sheave nest to a second receiver using at least a second securement assembly. In this exemplary embodiment or another exemplary embodiment, the method further comprises: engaging the third sheave nest to at least the first receiver with at least one securement assembly; and securing the third sheave nest to the first receiver with at least a second securement assembly. In this exemplary embodiment or another exemplary embodiment, the method further comprises: maintaining an arcuate orientation of the first group of suspension cables of the plurality of suspension cables; maintaining an arcuate orientation of the second group of suspension cables of the plurality of suspension cables;

In yet another aspect, the present disclosure provides a method of reconditioning a spreader beam, comprising: engaging at least a first clamp to a first group of suspension cables of a plurality of suspension cables of the spreader beam; installing at least a second clamp to a second group of suspension cables of the plurality of suspension cables of the spreader beam; disassembling the spreader beam; suspending a first plurality of sheaves from a first support with the first group of suspension cables of the plurality of suspension cables; suspending a second plurality of sheaves from a second support with the second group of suspension cables of the plurality of suspension cables; installing a first sheave nest with the first plurality of sheaves; installing a second sheave nest with the second plurality of sheaves; removing at least the first clamp from a first group of suspension cables of the plurality of suspension cables; and removing at least the second clamp from a second group of suspension cables of the plurality of suspension cables.

In yet another aspect, the disclosure provides a method of repairing a spreader beam, comprising: providing the spreader beam, wherein the spreader beam comprises: a main frame adapted to suspend a load of material; a first receiver operatively engaged with the main frame; a second receiver operatively engaged with the main frame; a first sheave nest removably engaged with the first receiver, wherein the first sheave nest is engaged with a first plurality of sheaves; a second sheave nest removably engaged with the second receiver wherein the second sheave nest is engaged with a second plurality of sheaves; engaging at least a first clamp to a first group of suspension cables of a plurality of suspension cables; installing at least a second clamp to a second group of suspension cables of a plurality of suspension cables; suspending the first and second pluralities of sheaves from a support with a plurality of suspension cables; wherein a first plurality of suspension cables is engaged with the first plurality of sheaves; wherein a second plurality of suspension cables is engaged with second plurality of sheaves; separating the respective sheave nests from the respective receivers wherein the suspension cables remain engaged with the sheaves; separating the respective pluralities of sheaves from the respective sheave nests wherein the suspension cables remain engaged with the sheaves; separating the respective pluralities of sheaves from respective pluralities of suspension cables; removing at least the first clamp from a first group of suspension cables of the plurality of suspension cables; and removing at least the second clamp from a second group of suspension cables of the plurality of suspension cables. In this exemplary embodiment or another exemplary embodiment, the method further comprises, securing the suspension cables wherein the suspension cables remain attached to the crane or upper support. In this exemplary embodiment or another exemplary embodiment, the step of separating at least the first sheave nest from the first receiver further comprises: removing at least a first securement assembly from at least the a first sheave nest and the first receiver. In this exemplary embodiment or another exemplary embodiment, the step of separating at least the first sheave nest from the first receiver further comprises: removing at least a second securement assembly from at least the first sheave nest and the first receiver. In this exemplary embodiment or another exemplary embodiment, the method further comprises removing at least one axle from the at least the first sheave nest. In this exemplary embodiment or another exemplary embodiment, the step of separating at least the first sheave nest from the first receiver further comprises: removing at least a first securement assembly from at least the second sheave nest and the second receiver. In this exemplary embodiment or another exemplary embodiment, the method further comprises removing at least one axle from the at least the second sheave nest. In this exemplary embodiment or another exemplary embodiment, the method further comprises: removing a cover plate from the first receiver; revealing an access port defined in the first receiver; and accessing at least a portion of the at least one securement assembly inside a chamber defined in the first receiver through the access port. In this exemplary embodiment or another exemplary embodiment, the step of removing the at least one securement assembly further comprises: disengaging at least one fastener from an end cap of the at least one securement assembly; disengaging the at least one fastener from a pin of the at least one securement assembly; and separating the end cap from the pin. In this exemplary embodiment or another exemplary embodiment, the step of removing the at least one securement assembly further comprises: removing the pin from the first sheave nest and the first receiver. In this exemplary embodiment or another exemplary embodiment, the step of separating at least the first sheave nest further comprises: removing at least a second securement assembly from the at least the first sheave nest and the first receiver; wherein the at least a second securement assembly is spaced apart from the at least a first securement assembly. In this exemplary embodiment or another exemplary embodiment, the method further comprises installing a third plurality of sheaves with a first plurality of suspension cables. In this exemplary embodiment or another exemplary embodiment, the step of installing the third sheave nest with the first receiver further comprises: resting the third sheave nest with the first receiver; and engaging the third sheave nest to at least the first receiver with at least one securement assembly. In this exemplary embodiment or another exemplary embodiment, the method further comprises: separating the second sheave nest from the second receiver; and installing a fourth sheave nest with the second receiver.

Another aspect of the disclosure provides a method of repairing a spreader beam, comprising: providing the spreader beam, wherein the spreader beam comprises: a main frame adapted to suspend a load of material; a first receiver operatively engaged with the main frame; a second receiver operatively engaged with the main frame; a first sheave nest removably engaged with the first receiver, wherein the first sheave nest is engaged with a first plurality of sheaves; a second sheave nest removably engaged with the second receiver, wherein the second sheave nest is engaged with a second plurality of sheaves; suspending the first and second pluralities of sheaves from a support with a plurality of suspension cables; wherein a first group of suspension cables of the plurality of suspension cables is engaged with the first plurality of sheaves; wherein a second group of suspension cables of the plurality of suspension cables is engaged with the second plurality of sheaves; separating the first sheave nest from the first receiver; wherein the first group of suspension cables remains engaged with the first plurality of sheaves; and separating the second sheave nest from the second receiver, wherein the second plurality of suspension cables remains engaged with the second plurality of sheaves. In this exemplary embodiment or another exemplary embodiment, the method further comprises: separating the first plurality of sheaves from the first sheave nest, wherein the first group of suspension cables remains engaged with the first plurality of sheaves. In this exemplary embodiment or another exemplary embodiment, the method further comprises: separating the first plurality of sheaves from the first group of suspension cables. In this exemplary embodiment or another exemplary embodiment, the method further comprises: securing a plurality of restraints to the main frame; and stabilizing the main frame, by the plurality of restraints, as the first and second sheave nests are separated from the main frame. In this exemplary embodiment or another exemplary embodiment, the step of separating at least the first sheave nest from the first receiver further comprises: removing at least a first securement assembly from the first sheave nest and the first receiver; and removing at least a second securement assembly from at least the first sheave nest and the first receiver. In this exemplary embodiment or another exemplary embodiment, the method further comprises: removing at least one axle from the at least the first sheave nest. In this exemplary embodiment or another exemplary embodiment, the step of separating at least the second sheave nest from the second receiver further comprises: removing at least a first securement assembly from at least the second sheave nest and the second receiver; and removing at least a second securement assembly from at least the second sheave nest and the second receiver. In this exemplary embodiment or another exemplary embodiment, the method further comprises: removing at least one axle from the at least the second sheave nest. In this exemplary embodiment or another exemplary embodiment, the method further comprises: removing a cover plate from the first receiver; revealing an access port defined in the first receiver; and accessing at least a portion of the at least one securement assembly inside a chamber defined in the first receiver through the access port. In this exemplary embodiment or another exemplary embodiment, the step of removing the at least one securement assembly further comprises: disengaging at least one fastener from an end cap of the at least one securement assembly; disengaging the at least one fastener from a pin of the at least one securement assembly; and separating the end cap from the pin. In this exemplary embodiment or another exemplary embodiment, the step of removing the at least one securement assembly further comprises: removing the pin from the first sheave nest and the first receiver. In this exemplary embodiment or another exemplary embodiment, the method further comprises: removing at least one axle from the first sheave nest and a first plurality of sheaves. In this exemplary embodiment or another exemplary embodiment, the method further comprises separating the first plurality of sheaves from the first group of suspension cables; and separating the second plurality of sheaves from the second group of suspension cables. In this exemplary embodiment or another exemplary embodiment, the method further comprises: installing a third plurality of sheaves to a first group of a plurality of suspension cables to provide suspended sheaves. In this exemplary embodiment or another exemplary embodiment, the method further comprises: installing the third plurality of sheaves in at least one sheave nest to form a plurality of nested sheaves. In this exemplary embodiment or another exemplary embodiment, the method further comprises: installing at least one axle through the plurality of nested sheaves and the at least one sheave nest wherein the plurality of nested sheaves are suspended in a plurality of suspension cables to provide a suspended sheave nest. In this exemplary embodiment or another exemplary embodiment, the method further comprises: installing a suspended sheave nest in a receiver of a spreader beam. In this exemplary embodiment or another exemplary embodiment, the method further comprises securing the sheave nest to the receiver using at least one securement assembly. In this exemplary embodiment or another exemplary embodiment, the method further comprises: securing the sheave nest to the receiver using at least a second securement assembly. In this exemplary embodiment or another exemplary embodiment, the step of installing the third sheave nest with the first receiver further comprises: resting the third sheave nest with the first receiver; and engaging the third sheave nest to at least the first receiver with at least one securement assembly.

Still another aspect of the disclosure provides a method of repairing a spreader beam, comprising: providing the spreader beam, wherein the spreader beam comprises: a main frame adapted to suspend a load of material; a first receiver operatively engaged with the main frame; a second receiver operatively engaged with the main frame; a first sheave nest removably engaged with the first receiver, wherein the first sheave nest is engaged with a first plurality of sheaves; a second sheave nest removably engaged with the second receiver wherein the second sheave nest is engaged with a second plurality of sheaves; suspending the first and second pluralities of sheaves from a support with a plurality of suspension cables; wherein a first group of suspension cables of the plurality of suspension cables is engaged with the first plurality of sheaves; wherein a second group of suspension cables of the plurality of suspension cables is engaged with the second plurality of sheaves; separating the first sheave nest from the first receiver; wherein the first group of suspension cables remains engaged with the first plurality of sheaves; and separating the second sheave nest from the second receiver, wherein the second plurality of suspension cables remains engaged with the second plurality of sheaves.

In still another aspect, the disclosure provides a method of repairing a spreader beam, comprising: providing the spreader beam, wherein the spreader beam comprises: a main frame adapted to suspend a load of material; a first receiver operatively engaged with the main frame; a second receiver operatively engaged with the main frame; a first sheave nest removably engaged with the first receiver, wherein the first sheave nest is engaged with a first plurality of sheaves; a second sheave nest removably engaged with the second receiver wherein the second sheave nest is engaged with a second plurality of sheaves; suspending the first and second pluralities of sheaves from a support with a plurality of suspension cables; wherein a first group of suspension cables of the plurality of suspension cables is engaged with the first plurality of sheaves; wherein a second group of suspension cables of the plurality of suspension cables is engaged with the second plurality of sheaves; separating the first sheave nest from the first receiver; separating the second sheave nest from the second receiver, wherein the second plurality of suspension cables remains engaged with the second plurality of sheaves; wherein the first group of suspension cables remains engaged with the first plurality of sheaves; and separating the second sheave nest from the second receiver, wherein the second plurality of suspension cables remains engaged with the second plurality of sheaves.

Yet another aspect of the disclosure is a method of repairing a spreader beam, comprising: providing the spreader beam, wherein the spreader beam comprises: a main frame adapted to suspend a load of material; a first receiver operatively engaged with the main frame; a second receiver operatively engaged with the main frame; a first sheave nest removably engaged with the first receiver, wherein the first sheave nest is engaged with a first plurality of sheaves; a second sheave nest removably engaged with the second receiver wherein the second sheave nest is engaged with a second plurality of sheaves; suspending the first and second pluralities of sheaves from a support with a plurality of suspension cables; wherein a first plurality of suspension cables is engaged with the first plurality of sheaves; wherein a second plurality of suspension cables is engaged with second plurality of sheaves; separating the respective pluralities of sheaves from the respective sheave nests wherein the suspension cables remain engaged with the sheaves; separating the respective sheave nests from the respective receivers wherein the suspension cables remain engaged with the sheaves; and separating the respective pluralities of sheaves from the suspension cables. In this exemplary embodiment or another exemplary embodiment, the method further comprises securing the suspension cables wherein the suspension cables remain attached to the crane or upper support. In this exemplary embodiment or another exemplary embodiment, the step of separating at least the first sheave nest from the first receiver further comprises: removing at least a first securement assembly from at least the first sheave nest and the first receiver. In this exemplary embodiment or another exemplary embodiment, the step of separating at least the first sheave nest from the first receiver further comprises: removing at least a second securement assembly from at least the first sheave nest and the first receiver. In this exemplary embodiment or another exemplary embodiment, the method further comprises: engaging at least a first clamp to a first group of suspension cables of the plurality of suspension cables and installing at least a second clamp to a second group of suspension cables of the plurality of suspension cables.

In still another aspect, the present disclosure provides a method of repairing a spreader beam, comprising: providing the spreader beam, wherein the spreader beam comprises: a main frame adapted to suspend a load of material; a first receiver operatively engaged with the main frame; a second receiver operatively engaged with the main frame; a first sheave nest removably engaged with the first receiver, wherein the first sheave nest is engaged with a first plurality of sheaves; a second sheave nest removably engaged with the second receiver wherein the second sheave nest is engaged with a second plurality of sheaves; engaging at least a first clamp to a first group of suspension cables of a plurality of suspension cables; installing at least a second clamp to a second group of suspension cables of a plurality of suspension cables; suspending the first and second pluralities of sheaves from a support with a plurality of suspension cables; wherein a first plurality of suspension cables is engaged with the first plurality of sheaves; wherein a second plurality of suspension cables is engaged with second plurality of sheaves; separating the respective pluralities of sheaves from the respective sheave nests wherein the suspension cables remain engaged with the sheaves; separating the respective pluralities of sheaves from the suspension cables; and separating the respective sheave nests from the respective receivers; and removing at least the first clamp from a first group of suspension cables of the plurality of suspension cables; and removing at least the second clamp from a second group of suspension cables of the plurality of suspension cables.

In this exemplary embodiment or another exemplary embodiment, the method further comprises securing the suspension cables wherein the suspension cables remain attached to the crane or upper support. In this exemplary embodiment or another exemplary embodiment, the step of separating at least the first sheave nest from the first receiver further comprises: removing at least a first securement assembly from at least the a first sheave nest and the first receiver. In this exemplary embodiment or another exemplary embodiment, the step of separating at least the first sheave nest from the first receiver further comprises: removing at least a second securement assembly from at least the first sheave nest and the first receiver.

BRIEF DESCRIPTION OF THE DRAWINGS

Sample embodiments of the present disclosure are set forth in the following description, are shown in the drawings and are particularly and distinctly pointed out and set forth in the appended claims.

FIG. 18B (FIG. 18B) is a side elevation view of sheaves being removed from suspension cables.

Similar numbers refer to similar parts throughout the drawings.

DETAILED DESCRIPTION

Figure 1:
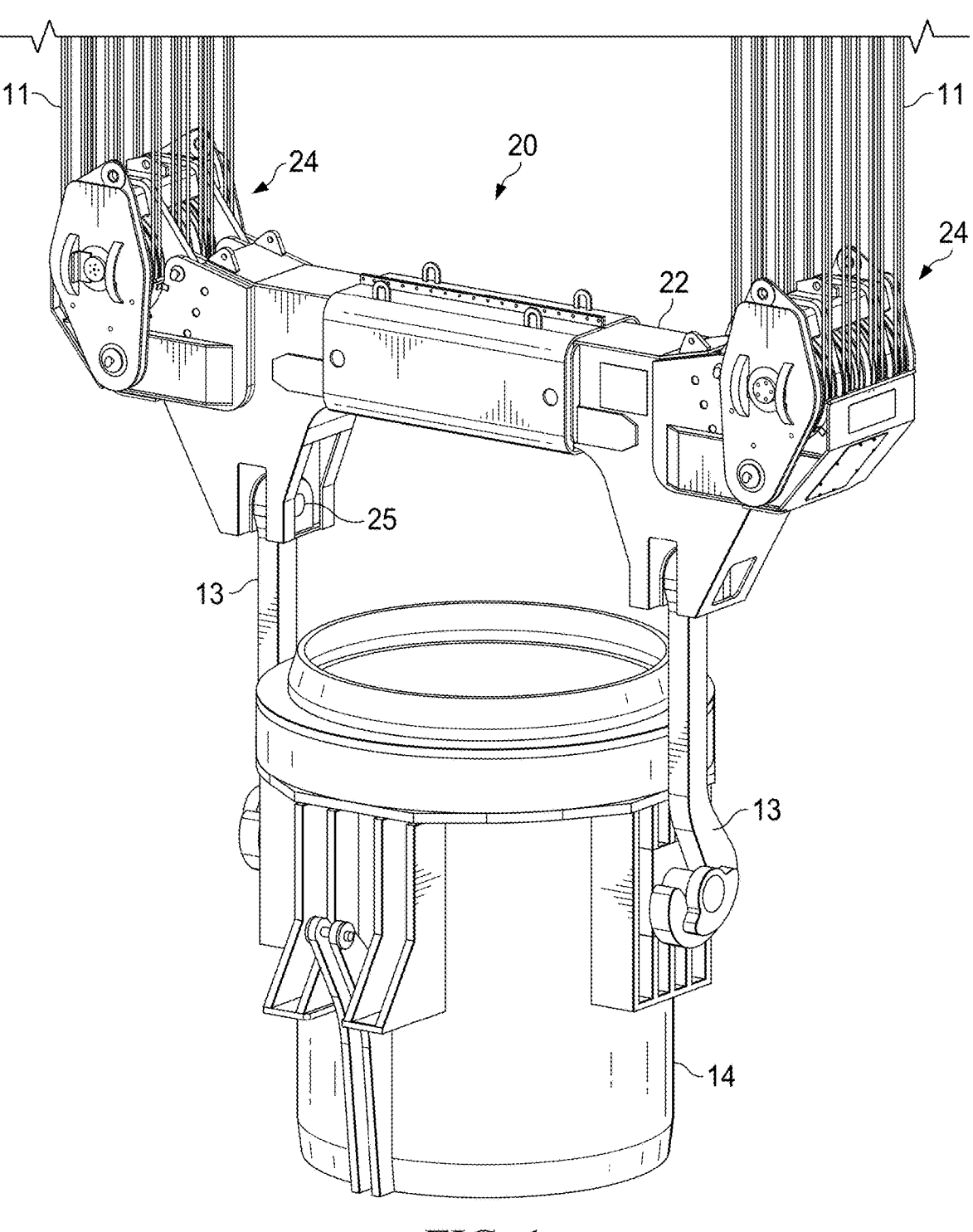
FIG. 1 (FIG. 1) is a perspective view of a spreader beam in accordance with one aspect of the present disclosure, wherein the spreader beam is carrying a load.

Referring to FIG. 1, spreader beam 20 is generally borne or lifted by crane 10 through suspension cables 11. Spreader beam 20 is used to carry a load such as a ladle 14 through one or more hooks 13.

For reference, a spatial axis system including directions 15, 17, and 19 correspond generally to the x-, y-, and z-axes, respectively. That is, 15 is generally horizontal, 17 is generally vertical, and 19 is generally the axis pointing toward the reader, or "out of the page." The x-axis may also be termed "longitudinal," while the y-axis may be termed "vertical" or "upright." Such terms are relative and not limiting.

Figure 2:
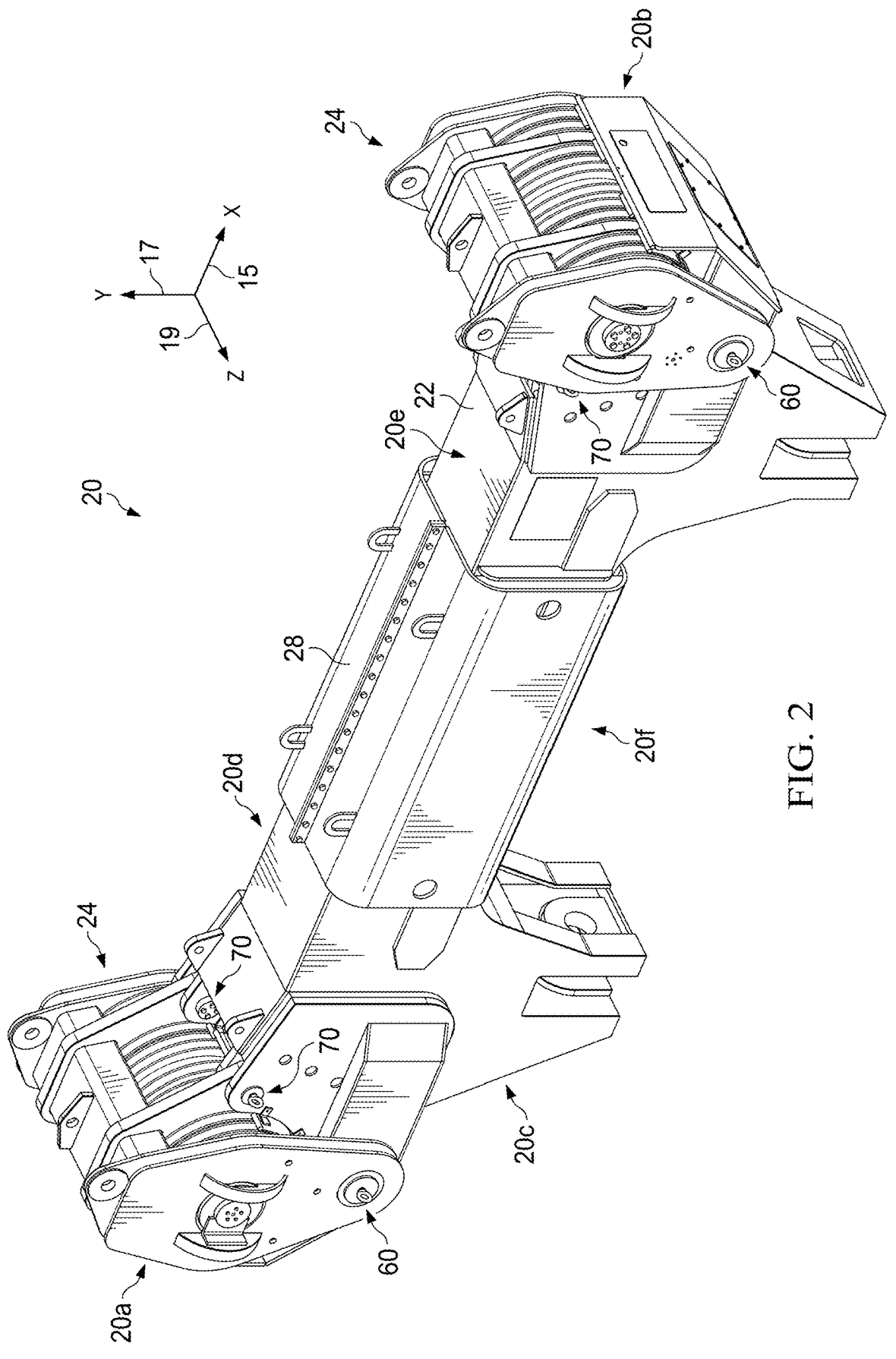
FIG. 2 (FIG. 2) is a top, front, right side isometric perspective view of the spreader beam as shown in FIG. 1.
Figure 3:
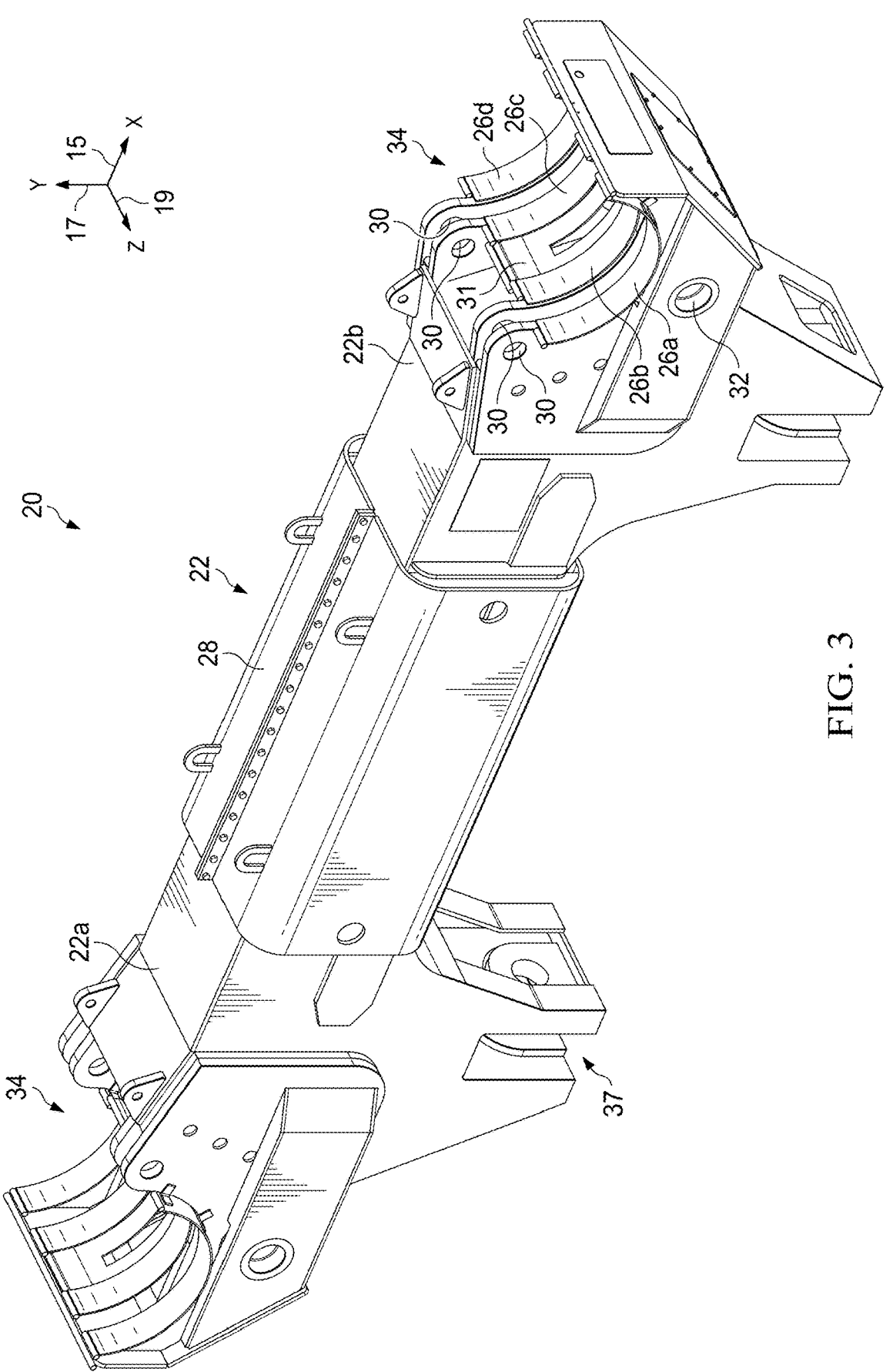
FIG. 3 (FIG. 3) is a top, front, right side isometric perspective view of a main frame of the spreader beam.

As best seen in FIGS. 1-3, spreader beam 20 generally includes a left side 20a that opposes right side 20b, a front side 20c that opposes a back side 20d, and a top side 20e that opposes a bottom side 20f. In addition, the spreader beam 20 includes a longitudinal axis in direction 15 that extends between the left side 20a and the right side 20b, a transverse axis in direction 19 that extends between the front side 20c and back side 20d, and a vertical axis in direction 17 that extends between the top side 20e and bottom side 20f. It should be understood that the terms "front", "rear", "top", "bottom", "right" and "left" are used to describe the orientation of the spreader beam 20 illustrated in the attached figures and should in no way be considered to limit the orientation in which spreader beam 20 may be utilized.

Referring now to FIGS. 2-4A, the spreader beam 20 includes a main frame 22 and at least one sheave nest 24 that operatively engages with the main frame 22 at a respective end; such engagement between the main frame 22 and the at least one sheave nest 24 is discussed in greater detail below. As best seen in FIG. 3, a belly band 28 (or other reinforcement) may also operatively engage with the main frame 22 to provide axial support along a lengthwise or longitudinal axis of main frame 22 that is parallel with the direction 15. It should be understood that main frame 22 is that portion of the spreader beam 20 not including sheave nests 24, belly band 28 or receivers 34.

Figure 5:
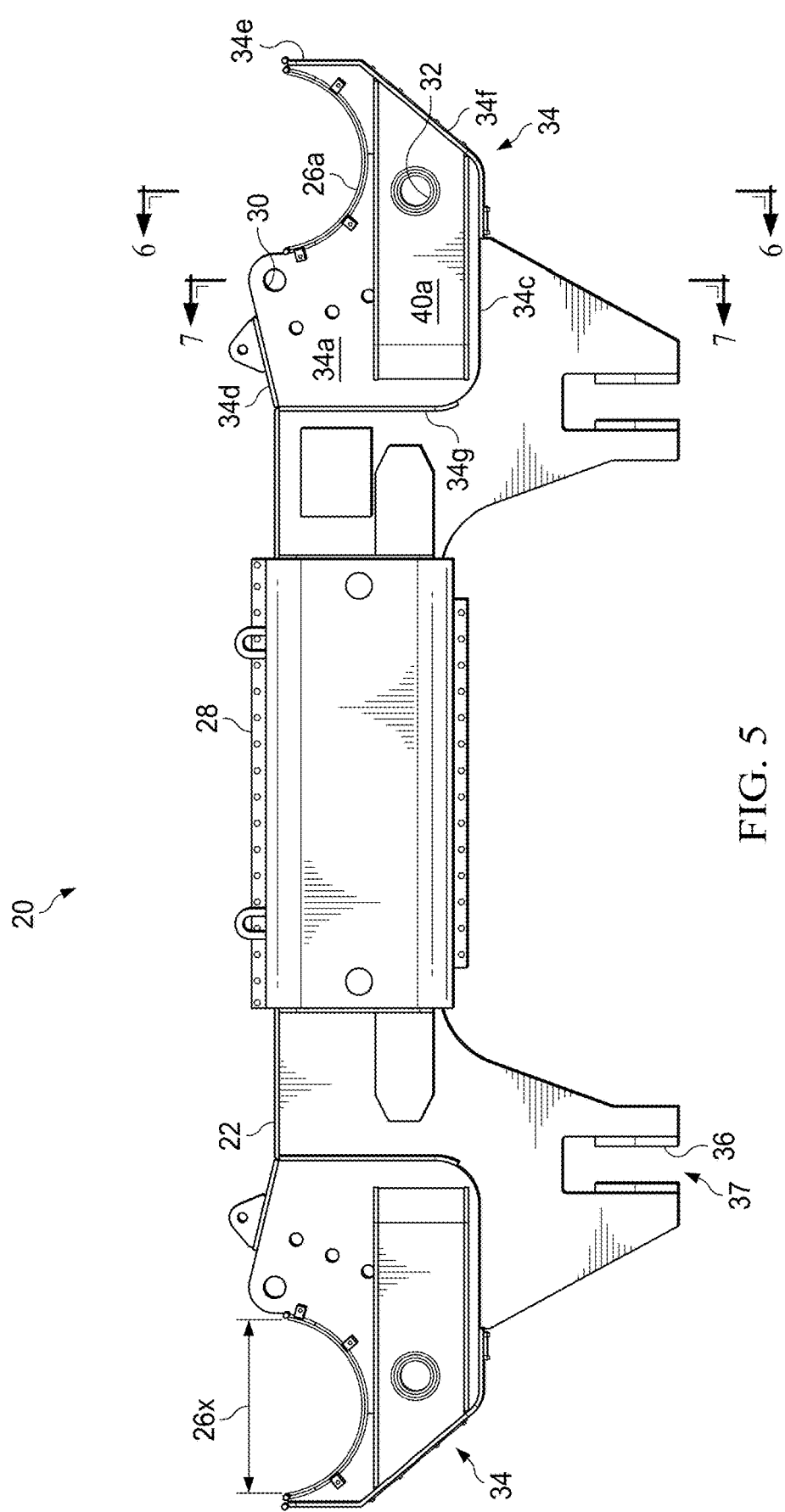
FIG. 5 (FIG. 5) is a front elevation view of the main frame of the spreader beam.

Referring to FIGS. 1 and 5, the spreader beam further includes one or more engagement points for carrying a load. For example, such an engagement point may be an arch or hook receiver 37 where at least one hook 13 or other load bearing member is removably and/or rotatably engaged. In one embodiment at least one hook 13 is removably and/or rotatably fastened to the spreader beam 20 through a hook pin 25 which holds at least one hook 13 in place. Bushings 36 may also be included to facilitate rotation of at least one hook 13 around hook pin 25.

Referring to FIG. 3, spreader beam 20 includes a pair of receivers 34 where each end of the main frame 22 includes a receiver of the pair of receivers 34 that receives and engages with a respective sheave nest 24. In the present disclosure, a first receiver 34 of the pair of receivers 34 operatively engages with the main frame 22 at a first end 22a of the main frame 22, and a second receiver of the pair of receivers 34 operatively engages with the main frame 22 at a second end 22b of the main frame 22 opposite to the first end 22a (see FIG. 3). For brevity, the following description of a receiver 34 is describing the second receiver 34; however, it should be understood that such description of the second receiver 34 applies to the first receiver 34.

Figure 4:
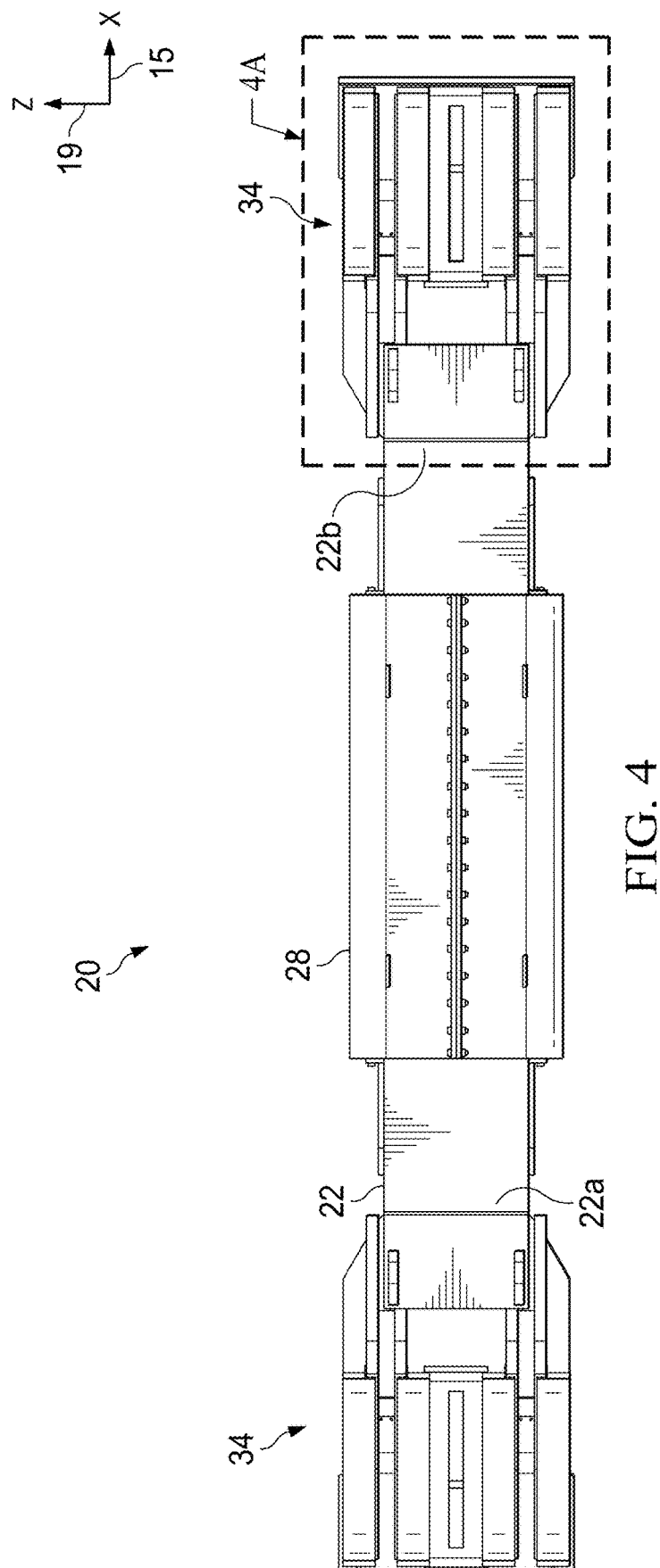
FIG. 4 (FIG. 4) is a top plan view of the main frame of the spreader beam.
Figure 4A:
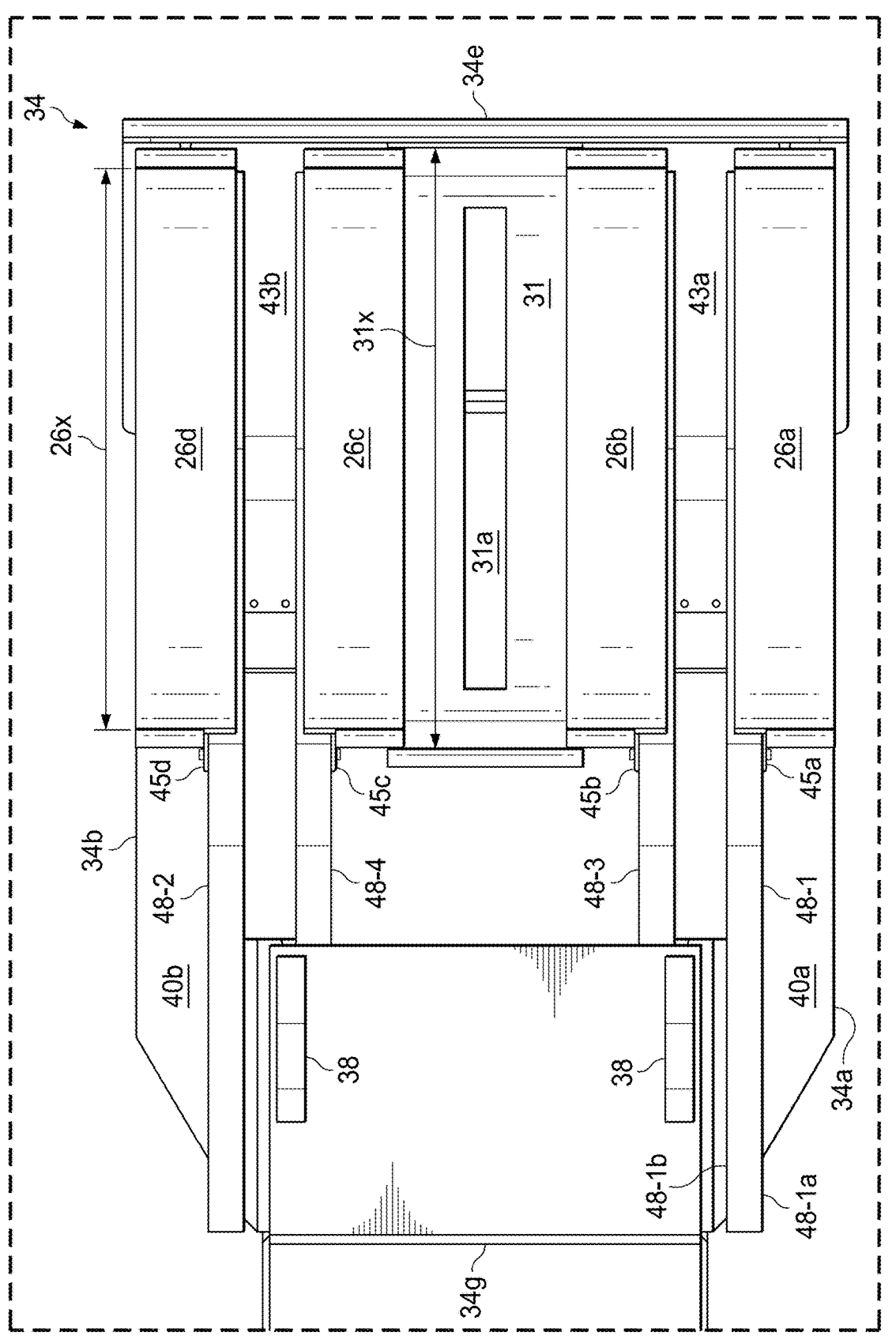
FIG. 4A (FIG. 4A) is an enlargement of the highlighted region of FIG. 4.

Referring to FIGS. 4A-5, receiver 34 is partially defined by walls 34a-34g which includes a first side wall 34a, a second side wall 34b opposite first side wall 34a, a bottom wall 34c, a top wall 34d opposite to the bottom wall 34c, and first and second distal walls 34e and 34f that are opposite to a proximal wall 34g. Side walls 34a and 34b are generally vertical, in the xy plane (direction 15 and 17). In this exemplary embodiment or another exemplary embodiment, each side wall 34a and 34b bears a reinforcing box 40a and 40b respectively. Bottom wall 34c is generally horizontal (in the xz plane-directions 15 and 19) when viewed from the front elevation view (see FIG. 5). Top wall 34d is generally also horizontal but may be angled with respect to the xz plane when viewed from the front elevation view (see FIG. 5). First and second distal walls 34e and 34f may be angled relative to one another. Alternatively, one or both of first and second distal walls 34e and 34f may be generally vertical, in the yz plane. In this exemplary embodiment or another exemplary embodiment, there is a single distal wall which conceptually includes first and second distal walls 34e and 34f adjoined in a single plane. All walls 34a-34g together with cradle plates 26a-26d and 31 define a chamber 81 to be discussed herein below.

Figure 10:
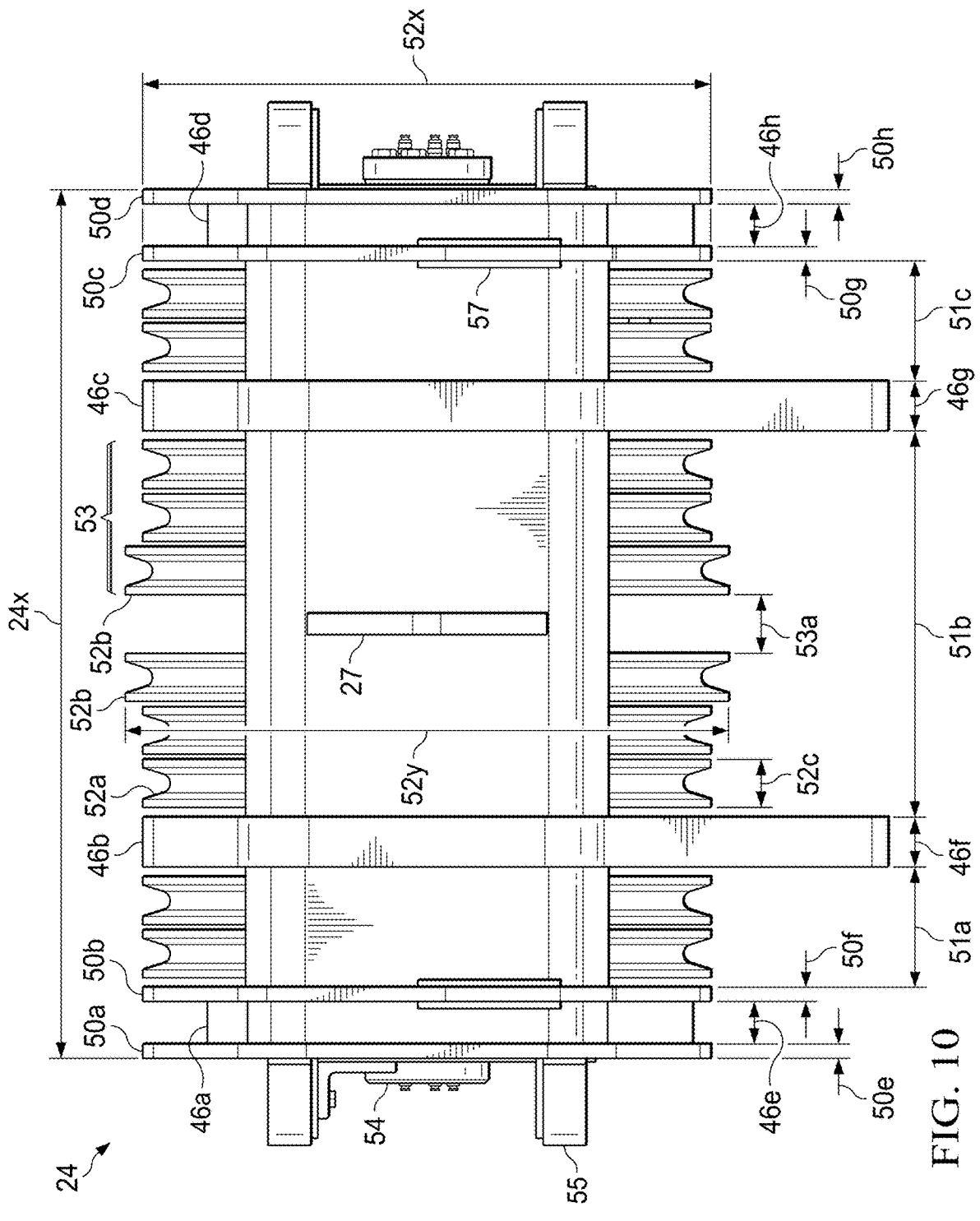
FIG. 10 (FIG. 10) is a top plan view of the sheave nest.

In this exemplary embodiment or another exemplary embodiment, referring to FIGS. 4A and 10, cradle plates 26a-26d are arcuate and/or curvilinear when viewed from a front elevation view as in FIG. 5. Such cradle plates 26a-26d are engaged with receiver plates 48-1-48-4 by mounting brackets 45a-45d. As an example, a first cradle plate 26a is engaged with a first receiver plate 48-1 by a first mounting bracket 45a. Cradle plates 26a-26d engage with, and receive sheaves 52a of sheave nest 24, when sheave nest 24 is engaged with receiver 34. In the present disclosure, a first compartment 43a is defined between first and second cradle plates 26a and 26b (see FIGS. 4A and 6). Similarly, a second compartment 43b is also defined between third and fourth cradle plates 26c and 26d. In the present disclosure, the first and second compartments 43a, 43b are spaced apart from and opposite to one another relative to an axis that is parallel with axis 19. Between cradle plates 26b and 26c is a cradle plate 31 which defines a third compartment 33. Sheaves 52a having diameter 52x engage with cradle plates 26a-26d. In an embodiment illustrated by FIG. 10, it is seen that two central sheaves 52b have a different diameter, represented by diameter 52y. This diameter difference among sheaves 52a and 52b is not required; sheaves 52a and 52b can be identical.

The central cradle plate 31, having diameter 31x, accommodates two central sheaves 52b. In this exemplary embodiment or another exemplary embodiment, sheaves 52 have a diameter 52x (in inches) of 28, 30, 32, 34, 36, 38, 40, 42, 44, 46, 48, or 50 or values therebetween. In this exemplary embodiment or another exemplary embodiment, sheaves 52b generally have a diameter 52y that is greater than diameter 52x of sheaves 52a. While not shown in the drawings, it will be evident to the skilled artisan that actual sheave diameter measurements may refer to the outer sheave diameter or the sheave pitch diameter.

As seen in FIGS. 4A and 5, the diameter 26x of cradle plates 26 is in one embodiment the same or similar to the diameter 52x of a sheave 52a. In this exemplary embodiment or another exemplary embodiment, diameter 26x of cradle plates 26 is greater than diameter 52x of sheaves 52a. Cradle plates 26 accommodate sheaves 52a. In this exemplary embodiment or another exemplary embodiment, cradle plates 26 have a diameter 26x (in inches) of 30, 32, 34, 36, 38, 40, 42, 44, 46, 48, or 50 or values therebetween.

In this exemplary embodiment or another exemplary embodiment, as best seen in FIG. 10, sheave nest 24 has a width 24x defined as the distance from the outer edge/face of flange 50a to the outer edge of flange 50d. This width 24x in this exemplary embodiment or another exemplary embodiment, may be, (in inches), 48, 50, 52, 54, 55, 56, 58, 60, 62, 64, 65, 66, 70, 72, 74, 75, 76, 78, 80 or other values there between. Axle 54 may have a length 54x (not shown) similar to, equal to or greater than the width 24x, with similar numerical values as noted in the preceding sentence.

In this exemplary embodiment or another exemplary embodiment, referring to FIG. 4A, receiver plates 48-1 to 48-4 are parallel to side walls 34a and 34b. Receiver plate 48-1 is proximate wall 34a and reinforcing box 40a, while receiver plate 48-2 opposes receiver plate 48-1 and is proximate side wall 34b and reinforcing box 40b. Receiver plate 48-3 is in the interior of receiver 34, and proximate receiver plate 48-1, and opposes interior receiver plate 48-4, which is proximate receiver plate 48-2. Each receiver plate 48-1 through 48-4 has two sides, for example, 48-1a, which faces side wall 34a and 48-1b, which faces side wall 34b.

In the present disclosure one or both of the first side wall 34a and the second side wall 34b includes one or more apertures which align with respective apertures of sheave nest 24 once the spreader beam 20 is assembled. In particular, first side wall 34a and/or second side wall 34b may define at least one of an upper receiver aperture 30 and a lower receiver aperture 32. As best seen in FIG. 3, upper receiver aperture 30 is also defined in an upper portion of side wall 34a near the top side 20e of spreader beam 20. Owing to symmetry, the same is true for side wall 34b with respect to upper receiver aperture 30. Still referring to FIG. 3, lower receiver aperture 32 is defined in a lower portion of side wall 34a near the bottom side 20f of spreader beam 20 and in reinforcing box 40a. Owing to symmetry, the same is true for side wall 34b and reinforcing box 40b. Owing to symmetry, the same is true for side wall 34b with respect to lower receiver aperture 32.

Figure 7:
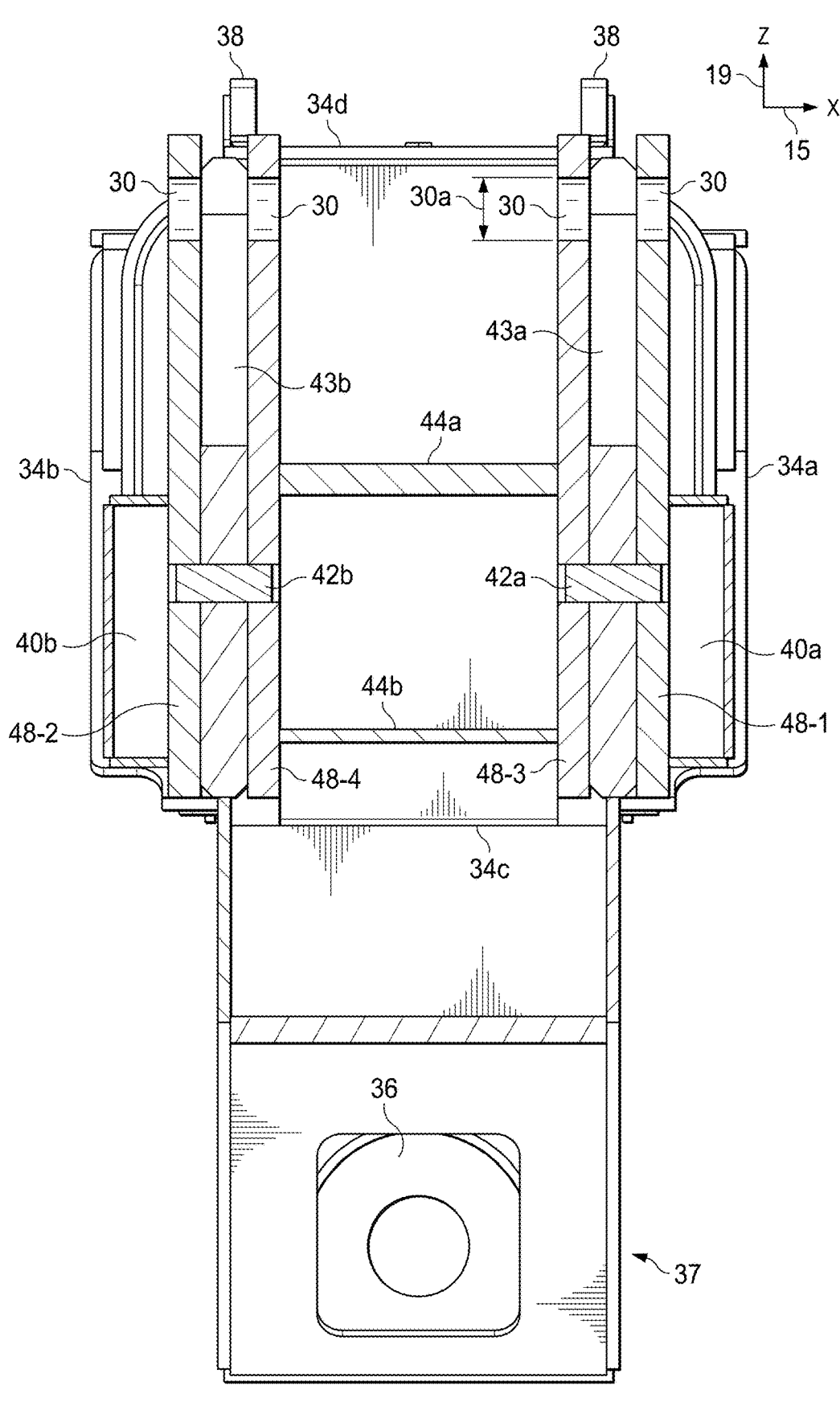
FIG. 7 (FIG. 7) is a cross-sectional view taken along line 7-7 in FIG. 5.

As best seen in FIG. 7, each receiver plate 48-1 through 48-4 defines an upper receiver aperture 30 in an upper portion of the receiver plates 48-1 through 48-4 near the top wall 34d of the receiver 34. As best seen in FIG. 7, each receiver plate 48-1 through 48-4 defines a lower receiver aperture 32 in a lower portion of receiver plates 48 near the bottom side 20f of spreader beam 20.

Figure 6:
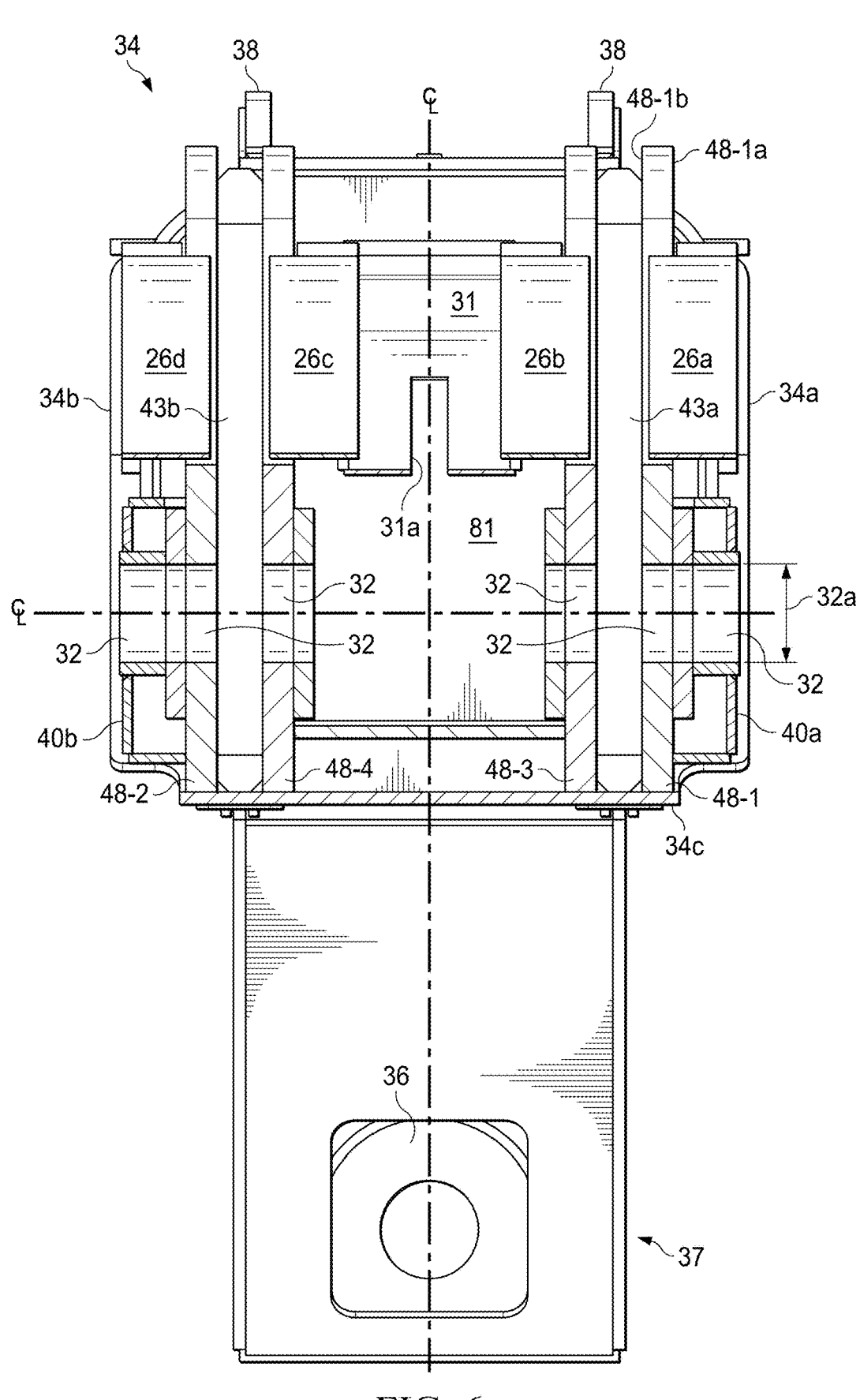
FIG. 6 (FIG. 6) is a cross-sectional view taken along line 6-6 in FIG. 5.

Referring to FIG. 6, the lower receiver aperture 32 of each receiver plate 48-1 through 48-4 is coaxial with the lower receiver apertures 32 of the first side wall 34a and the second side wall 34b. For the avoidance of doubt, lower receiver apertures 32 are defined in first side wall 34a, second side wall 34b, receiver plates 48-1 through 48-4, and reinforcing boxes 40a and 40b. For the avoidance of doubt, upper receiver apertures 30 are defined in first side wall 34a, second side wall 34b and all receiver plates 48-1 through 48-4. Further referring to FIG. 7, cross members, 42a, 42b, 44a and 44b are each operatively engaged with at least two receiver plates 48 to provide support in direction 15.

As seen in FIGS. 13, a first sheave nest 24 is removably engaged with receiver 34 by at least one securement assembly 60, 70. As best seen in FIG. 13A, a first or lower securement assembly 60 is inserted into and received by the receiver 34 inside the lower receiver apertures 32, and also by a lower sheave nest aperture 49 of sheave nest 24. First receiver aperture 32 has a diameter 32a (see FIG. 6), and lower sheave nest aperture 49 has a diameter 49a (see FIG. 9). In at least one embodiment, it will be appreciated that 32a and 49a are the same diameter. In at least one embodiment, diameters 32a and 49a correspond to the diameter 61a of a pin 61 of the lower securement assembly 60.

In another embodiment, a second or upper securement assembly 70 may be simultaneously inserted through upper sheave nest aperture 47 of sheave nest 24 and upper receiver apertures 30 of receiver 34 such that the upper securement assembly 70 removably engages the sheave nest 24 with receiver 34. In this exemplary embodiment or another exemplary embodiment, when sheave nest 24 is engaged with receiver 34, upper sheave nest aperture 47 and upper receiver aperture 30 are coaxial with one another. It will be appreciated that in at least one embodiment, lower receiver aperture 32 and lower sheave nest aperture 49 have the same diameter (32a and 49a, respectively), which correspond to the diameter 61a of a pin 61 of the lower securement assembly 60.

Figure 11:
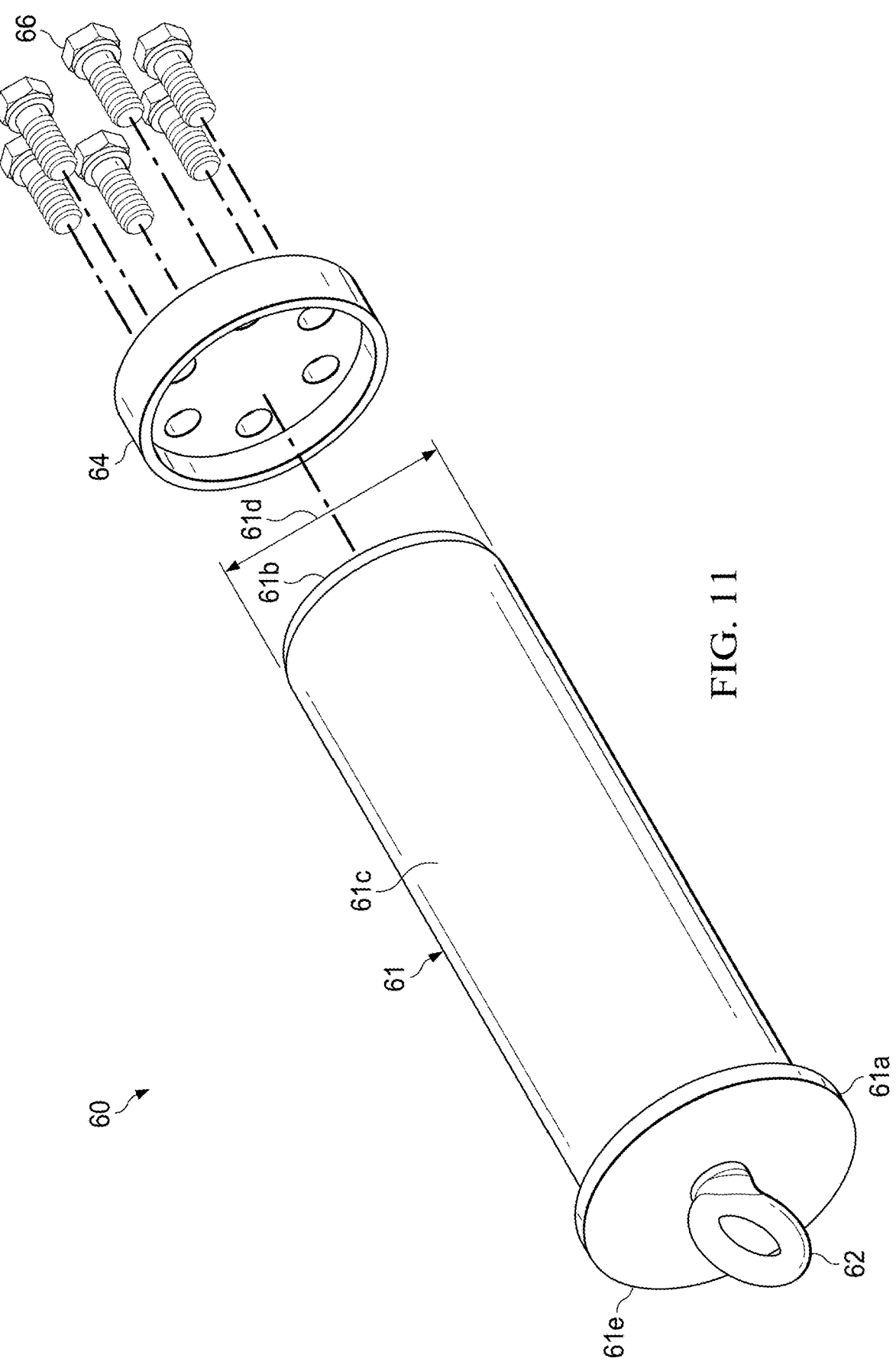
FIG. 11 (FIG. 11) is an exploded view of a lower securement assembly of the spreader beam.

Referring to FIG. 11, lower securement assembly 60 includes an elongate pin 61 having a first end 61a and a second end 61b connected by a cylindrical wall 61c. Pin 61 also defines a diameter 61d along the entire length of pin 61 between the first end 61a and the second end 61b. First end 61a in one embodiment also includes end plate 61e which may have diameter 61d or another diameter, for example greater than diameter 61d, (not shown). End cap 64 is releasably engaged with pin 61 by at least one fastener 66. Diameter 61d of pin 61 in one embodiment may correspond to an inner diameter (not shown) of end cap 64. The outer diameter (not shown) of end cap 64 may be greater than diameter 61d.

The diameter 61d of pin 61, lower sheave nest aperture 49 and lower receiver aperture 32 are such that the pin 61 is received by and engages with the sheave nest 24 and receiver 34 through lower sheave nest aperture 49 and lower receiver aperture 32. In one exemplary embodiment, diameter 61d of pin 61 is the same as diameter 32a of lower receiver aperture 32 and diameter 49a of lower sheave nest aperture 49. In one embodiment, the diameter 32a of lower receiver aperture 32 and diameter 49a of lower sheave nest aperture 49 is 4-10", preferably 5-9", more preferably 6-8" and most preferably 7". Eye bolt 62 is operatively engaged with the first end 61a of the pin 61. In one exemplary embodiment, the eye bolt 62 is screwed into first end 61a of the pin 61.

Figure 12:
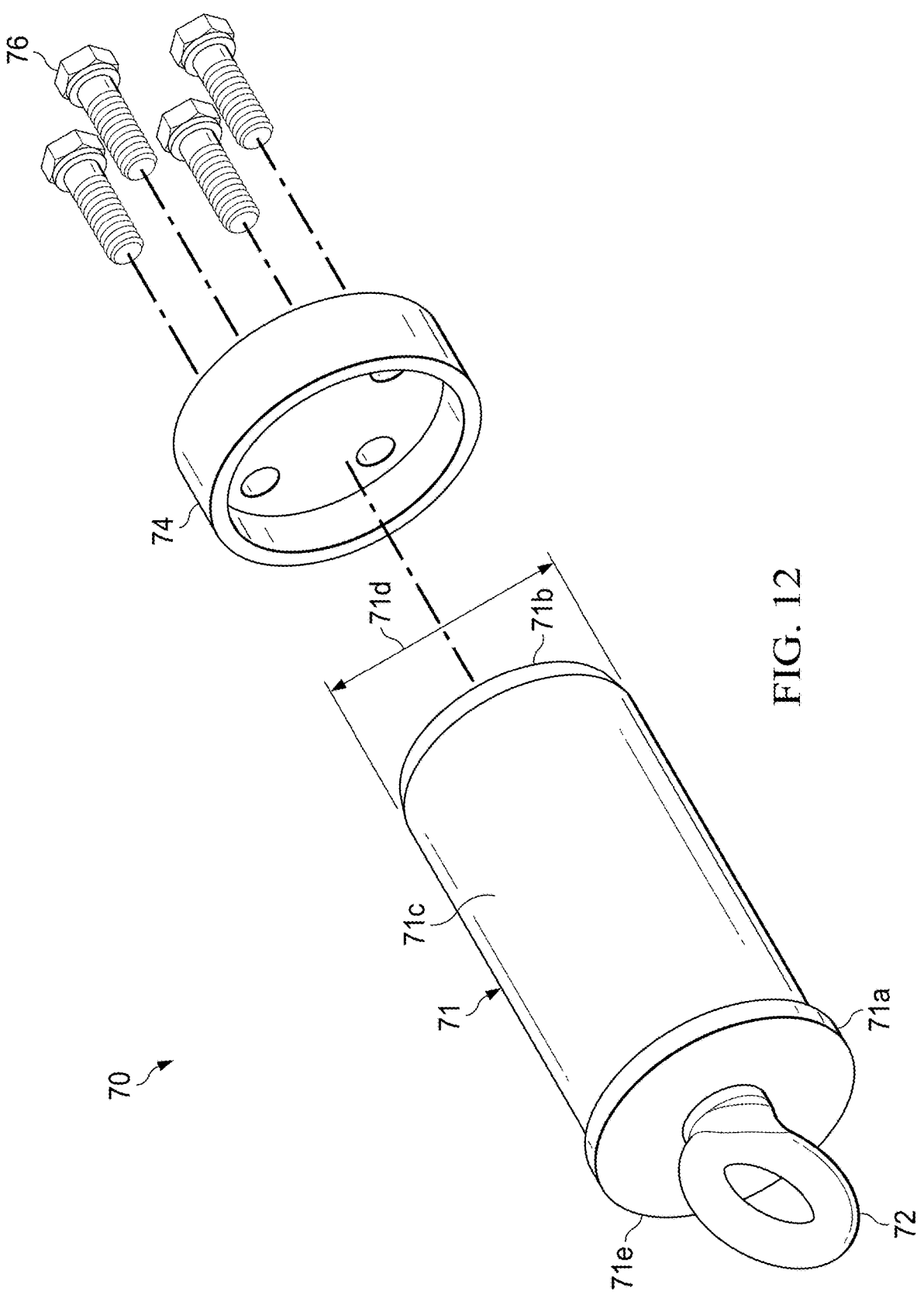
FIG. 12 (FIG. 12) is an exploded view of a upper securement assembly of the spreader beam.

As seen in FIG. 12, upper securement assembly 70 includes an elongate pin 71 having a first end 71a and a second end 71b connected by a cylindrical wall 71c. Pin 71 also defines a diameter 71d along the entire length of pin 71 between the first end 71a and the second end 71b. First end 71a in one embodiment also includes end plate 71e which may have diameter 71a or another diameter not shown. In one embodiment, diameter 71d of pin 71 is the same as diameter 30a of upper receiver aperture 30 and diameter 47a of upper sheave nest aperture 47. Pin 71 is received by and engages with the sheave nest 24 and receiver 34. An eyebolt 72 is also operatively engaged with first end 71a of pin 71. In one exemplary embodiment, the eyebolt 72 is screwed into first end 71a of the pin 71. End cap 74 is releasably engaged with pin 71 by at least one fastener 76. Diameter 71d of pin 71 in one embodiment may correspond to an inner diameter (not shown) of end cap 74. The outer diameter (not shown) of end cap 74 may be greater than diameter 71d. The diameter (not shown) of first end 71a of pin 71 may in one embodiment be greater than diameter 71d of pin 71. It is understood that at least one fastener 66, 76 may be a bolt. In one embodiment, the diameter 30a of upper receiver aperture 30 and diameter 47a of upper sheave nest aperture 47 are 3-7", preferably 4-6", and most preferably 5". The securement assemblies 60 and 70 are generally elongate and generally have a cross section that is circular, that is, the securement assemblies 60 and 70 are cylindrical, however other shapes are possible. Lower securement assembly 60 and associated parts may have the same or different dimensions as upper securement assembly 70 and its respective associated parts.

Figure 13A:
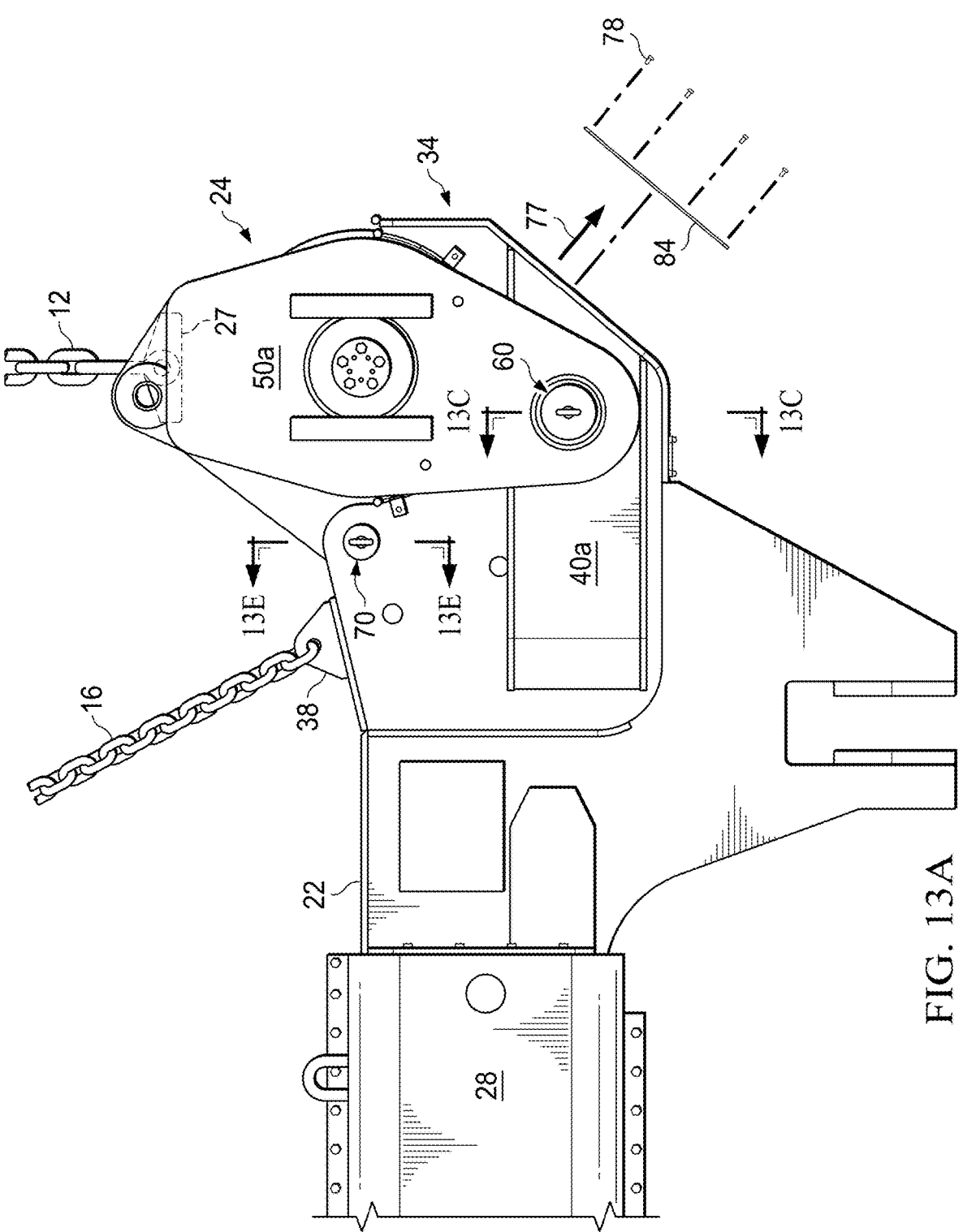
FIG. 13A (FIG. 13A) is an operational view of the spreader beam, wherein a cover plate of the spreader beam is removed from the main frame.

FIG. 13A depicts sheave nest 24 engaged with receiver 34 in its operational configuration. That is, sheave nest 24 is securely attached to receiver 34 through lower securement assembly 60 and upper securement assembly 70. In some embodiments, sheave nest 24 may be attached to receiver 34 by the lower securement assembly 60 or the upper securement assembly 70 if desired.

Figure 13B:
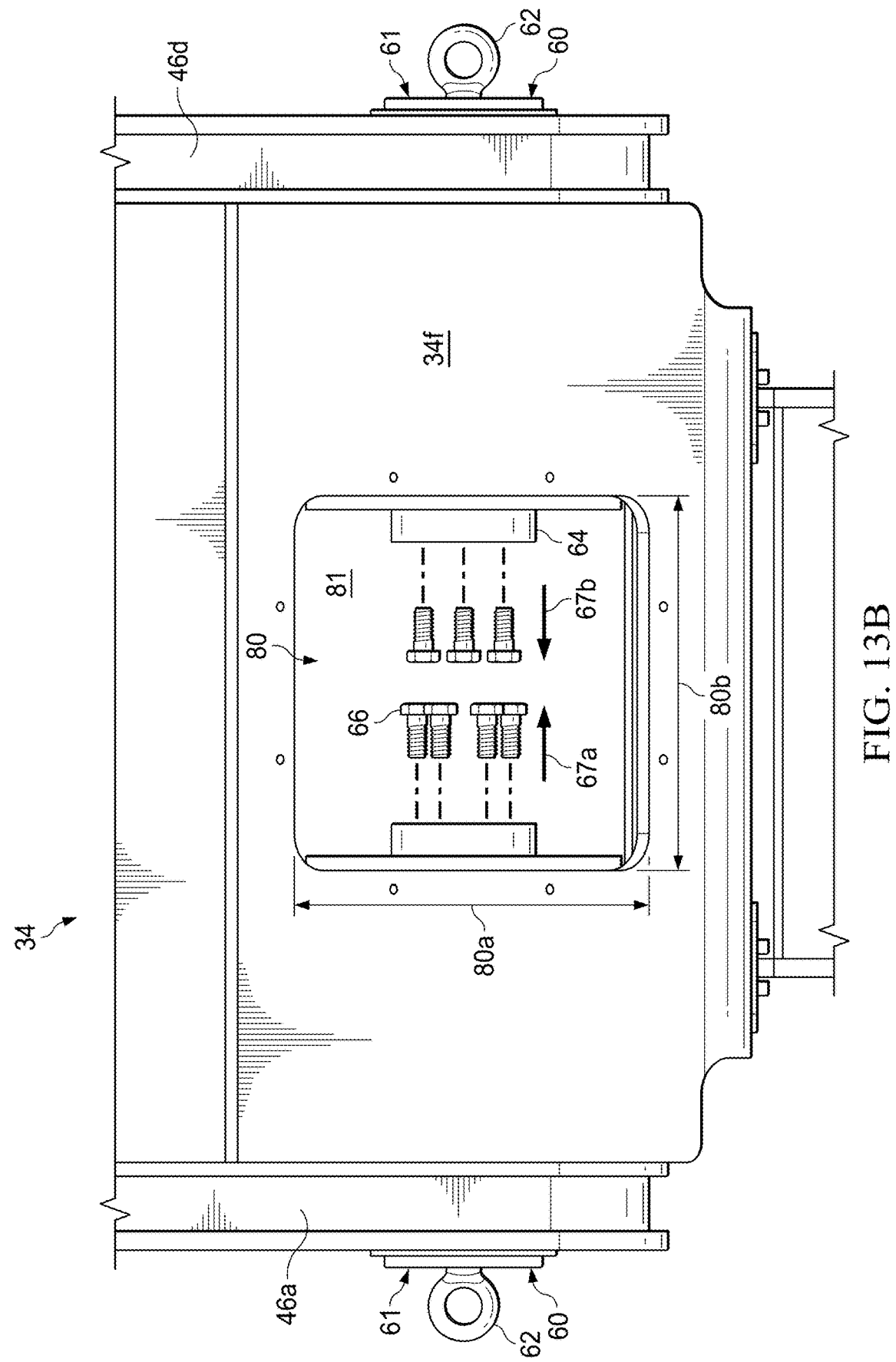
FIG. 13B (FIG. 13B) is another operational view similar to FIG. 13A, but fasteners of the lower securement assemblies are loosened and removed from pins and the end caps of the lower securement assemblies.
Figure 13C:
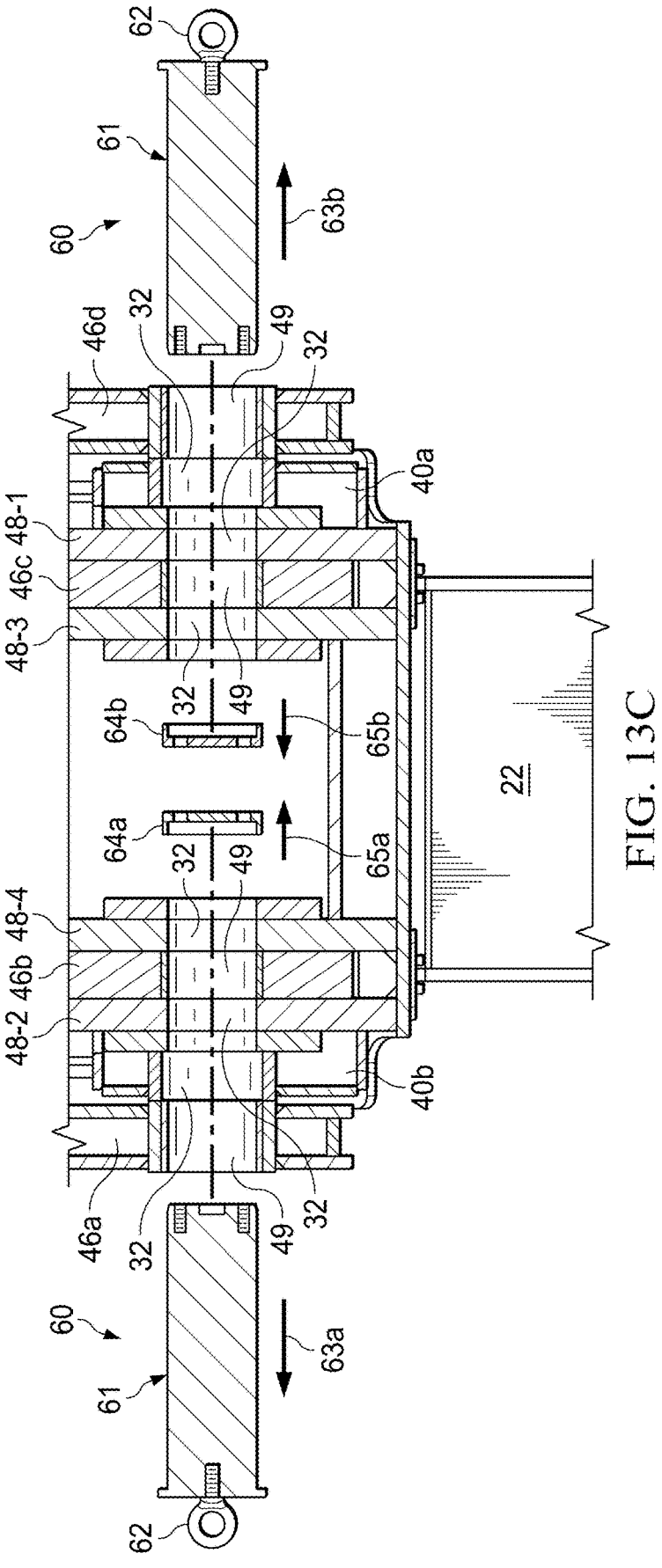
FIG. 13C (FIG. 13C) is another operational view similar to FIG. 13B, but the pins and the end caps of the lower securement assemblies are disengaged from one another and removed from the main frame and respective sheave nest.
Figure 13D:
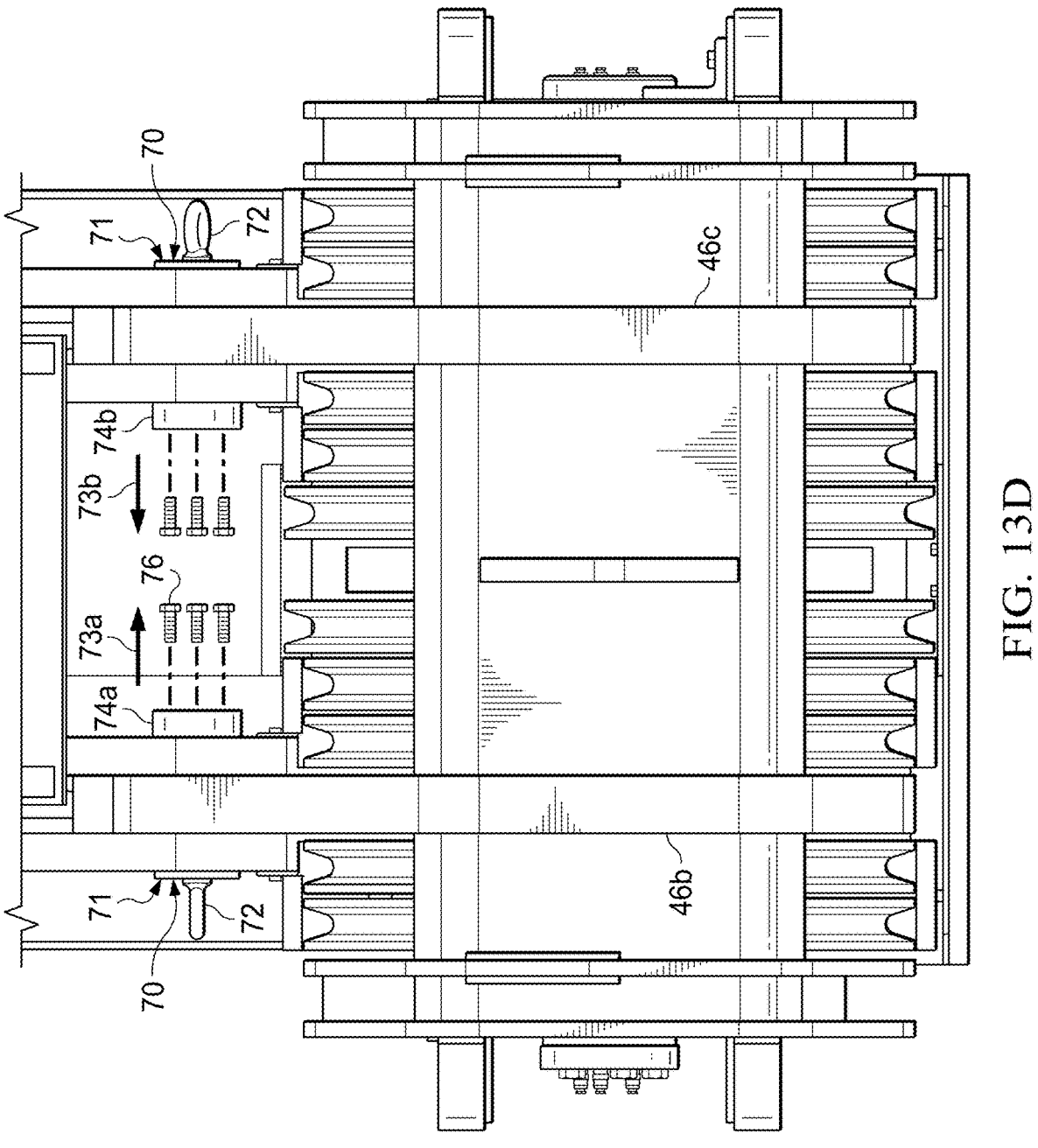
FIG. 13D (FIG. 13D) is another operational view of a sheave nest and another portion of a spreader beam, wherein fasteners of upper securement assemblies are being loosened and removed from pins and the end caps of the upper securement assemblies.

As seen in FIGS. 13B-13D, lower securement assembly 60 is received by and releasably engages with sheave nest 24 at the lower sheave nest aperture 49 and with receiver 34 at the lower receiver apertures 32. In one exemplary embodiment, lower securement assembly 60 may be received by only an outer nest plate subassembly that includes nest flanges 50a and 50b together with nest plate 46a, or it may be further received by nest plate 46b. Alternatively, lower securement assembly 60 may be received by and releasably engage with all nest plates 46a-46d or any subgrouping thereof and/or all nest flanges 50a-50d or any subgrouping thereof.

Figure 13E:
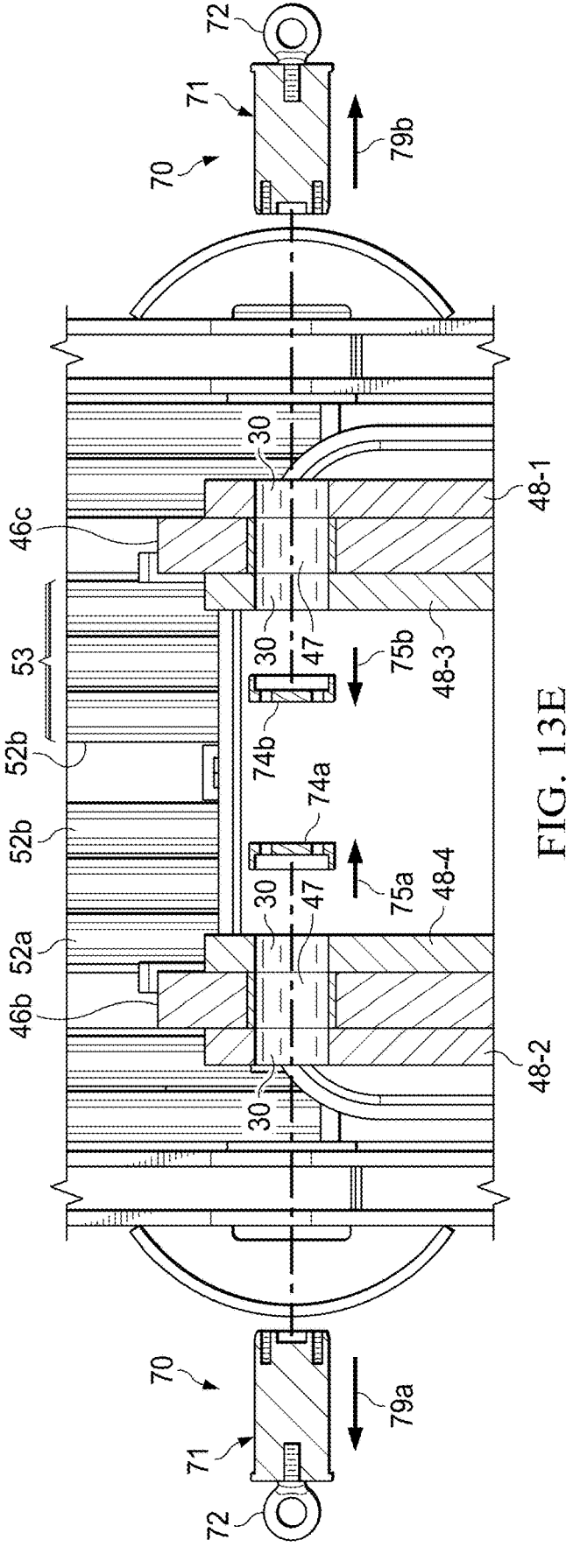
FIG. 13E (FIG. 13E) is another operational view similar to FIG. 13D, but the pins and the end caps of the upper securement assemblies are disengaged from one another and removed from the main frame and respective sheave nest.

As seen in FIG. 13E, upper securement assembly 70 is received by and releasably engages with a sheave nest 24 at upper sheave nest aperture 47 and with receiver 34 at the upper receiver apertures 30. In one exemplary embodiment, upper securement assembly 70 may be received by only nest plate 46b or nest plate 46c. Alternatively, upper securement assembly 70 may be received by and releasably engage with nest plates 46b and 46c.

Figure 8:
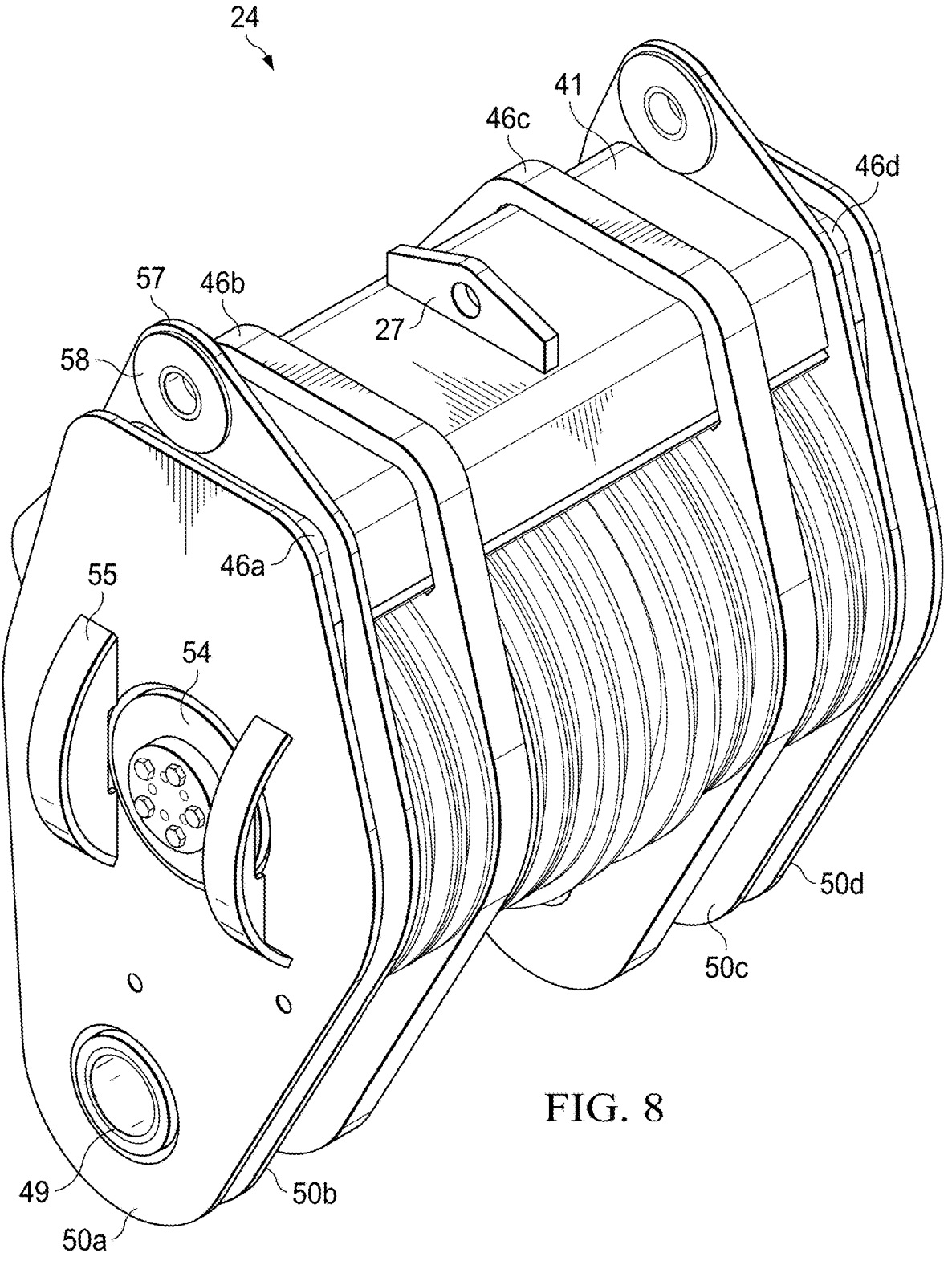
FIG. 8 (FIG. 8) is a top, front, right side perspective view of a sheave nest of the spreader beam shown in FIG. 2.
Figure 9:
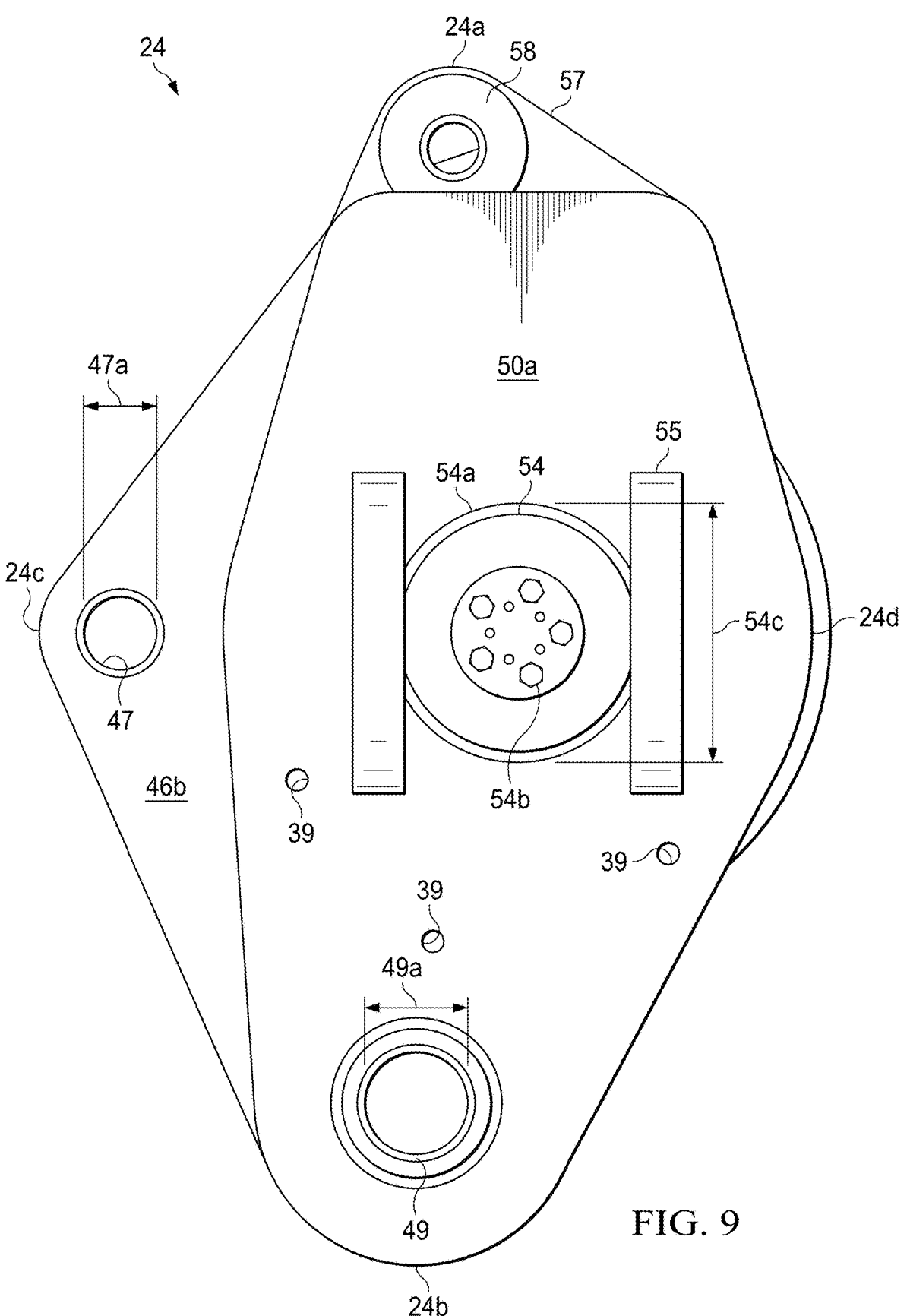
FIG. 9 (FIG. 9) is a front elevation view of the sheave nest.

As seen in FIGS. 8 and 9, sheave nest 24 comprises main weldment 41, to which nest flanges 50a-50d and nest plates 46a-46d are integrally connected which forms the main structure of sheave nest 24. In one embodiment, and as best seen in FIG. 10, a first nest plate 46a is positioned between first and second nest flanges 50a, 50b, while a second nest plate 46d is positioned between third and fourth nest flanges 50c, 50d. Nest plates 46c and 46d may be also positioned between other nest flanges 50 and/or similar components (not shown) when required for structural purposes; however, such configuration is not preferred and/or required herein. Other configurations are possible.

Still referring to sheave nest 24, a lower sheave nest aperture 49 is defined in each nest flange 50a-50d and in each nest plate 46a-46d. Sheave nest 24 may also define a upper sheave nest aperture 47 in at least a second nest plate 46b and third nest plate 46c. In one exemplary embodiment, an upper sheave nest aperture 47 may alternatively be defined in at least one nest plate 46a-46d and in at least one nest flange 50a-50d or any subset thereof.

Further referring to FIG. 8 and also referring to FIG. 10, at least one sheave 52 is interspersed between, and rotatably engaged with, nest plates 46a-46d and/or nest flanges 50a-50d. In one embodiment, a plurality of sheaves 52 is present. In this or another embodiment, a first set of sheaves of the plurality of sheaves 52 is between nest plates 46a and 46b, a second set of sheaves of the plurality of sheaves 52 is between nest plates 46b and 46c, and a third set of sheaves of the plurality of sheaves 52 is between nest plates 46c and 46d. In the foregoing discussion, it is presumed that at least one of nest plates 46a-46d is surrounded by nest flanges 50. In the present disclosure, a sheave assembly 53 comprises is a plurality of sheaves 52 between two consecutive nest plates, for example 46b and 46c. In one embodiment, the number of sheaves 52 between nest plates 46a and 46b is equal to the number between nest plates 46c and 46d. The same or a different number of sheaves 52 may be between nest plates 46b and 46c. In various embodiments, a sheave assembly 53 may include two, three, four, five, six, or more sheaves 52.

As seen in FIG. 9, a sheave nest 24 comprises upper and lower ends 24a and 24b, proximal end 24c and distal end 24d. Such terms are taken relative to the spreader beam 20. Sheave nest ends 24a-24d are generally rounded. Upper sheave nest end 24a may be taken to mean the upper portion of any of nest flanges 50a-50d or the upper portion of any of nest plates 46a-46d or both. Proximal end 24c is generally taken to be the proximal curve of nest plates 46, however it may include the proximal end of nest flanges 50. Axle 54 operatively engages with and is housed inside at least one nest flange 50a, at least one nest plate 46a, and at least one sheave 52. In one embodiment, axle 54 extends through all nest flanges 50 and all nest plates 46 that are present in sheave nest 24. Axle 54 forms an axis of rotation about which sheaves 52 rotate during operation of sheave nest 24 while engaged with spreader beam 20. Axle 54 comprises axle cap 54a and is fastened by one or more axle bolts 54b and has a diameter 54c. In this exemplary embodiment or another exemplary embodiment, axle diameter 54c is generally greater than diameter 49a of lower sheave nest aperture 49. Similarly, lower receiver aperture diameter 49a is generally greater than diameter 47a of upper sheave nest aperture 47. In one embodiment, one or more end axle cap protectors 55 protects and generally protrudes beyond the profile of axle cap 54a. In this exemplary embodiment or another exemplary embodiment, axle diameter 54c is about 6-10", preferably about 7-9" and most preferably about 8".

In a top-down view, FIG. 10 shows the generally parallel structure of nest plates 46, nest flanges 50, and sheaves 52, which are also further defined by various dimensions. For example, nest plate thicknesses 46e-46h are generally greater than respective nest flange thicknesses 50e-50h, but need not be. The thicknesses of nest plates 46e-46h are generally the same, but need not be. The thicknesses of nest flanges 50e-50h are generally the same, but need not be. Further, nest plate gap 51b (that between nest plate 46b and 46c) is generally greater than nest plate gap 51a (between nest plates 46a and 46b) and nest plate gap 51c (between nest plates 46c and 46d). The width 52c of a sheave 52 is determined by the thickness or diameter (not shown) of the cable 11. The width 52c of sheaves 52 may be the same or different. In this exemplary embodiment or another exemplary embodiment, width 52c may be 2", 2.5" 3", 3.5", 4", 4.5", 5", 5.5" 6", 6.5", 7", 7.5", 8" or other values therebetween.

The diameter 52a of sheaves 52 may be the same or different. In this exemplary embodiment or another exemplary embodiment, sheave diameter 52a may be (in inches) 24, 25, 26, 27.5, 28, 30, 32, 32.5, 34, 35, 36, 37.5, 38, 40, 42, 42.5, 44, 45, 46, 47.5, 48, or 50 or other values therebetween. There may be (but need not be) a gap 53a, between individual sheaves 52 or between sheave assemblies 53.

A sheave nest 24 may further comprise at least one lifting lug 27 by which to lift the sheave nest 24 out of a spreader beam 20. Sheave nest 24 may also further comprise one or more equalizer lifting lugs 57 where sheave nest 24 is removably engaged with an equalizer 56. A an equalizer lifting lug 57 may comprise at least one bushing 58.

FIG. 13A depicts sheave nest 24 engaged with receiver 34 in its operational configuration. That is, sheave nest 24 is securely attached to receiver 34 through securement assembly 60 and securement assembly 70.

In this exemplary embodiment or another exemplary embodiment, a single securement assembly 60 is used to releasably engage sheave nest 24 with receiver 34 through lower sheave nest aperture 49 and lower receiver aperture 32.

FIG. 13A also depicts the operation where sheave nest 24 is about to be removed from receiver 34. Cover plate 84, which is removably engaged with distal wall 34f, is pulled in direction 77 (such action is denoted by an arrow labeled 77) after removing at least one fastener 78, for example, a bolt, from cover plate 84. FIG. 13B then shows the end view of receiver 34 after cover plate 84 is removed to reveal access port 80. In this exemplary embodiment or another exemplary embodiment, access port 80 provides access to the lower securement assemblies 60, including pins 61, end caps 64, and fasteners 66, which are located in chamber 81. Access port 80 has a height 80a and a width 80b, which may be the same or different. Height 80a and width 80b may independently be about 18", 20", 24", 30", 35", 36", 40", 42", 45", 48", or other values therebetween.

To continue the removal of a sheave nest 24 from receiver 34, fasteners 66 are moved in directions 67a and 67b to disengage them from pins 61 and end caps 64. In this operation, fasteners 66 are simply loosened and/or unscrewed from pins 61 by a tool or device that may apply torque on said fasteners 66. In FIG. 13C, it is seen that end caps 64a and 64b are removed from pins 61 by pulling in directions 65a and 65b respectively. Pins 61 may be pulled by grasping eye bolts 62. Pins 61 are pulled in directions 63a and 63b, respectively. At this point, sheave nest 24 is separable from the receiver 34 at the lower sheave nest aperture 49 and at the lower receiver aperture 32.

Once the lower securement assemblies 60 are removed from the sheave nest 24 and the receiver 34, such operations of removing the upper securement assemblies 70 from the sheave nest 24 and receiver 34 are now undertaken. FIG. 13D shows the removal of fasteners 76 from pins 71 and end caps 74 by unscrewing the fasteners 76 from the pins 71 and end caps 74 and pulling in directions 73a or 73b as appropriate. FIG. 13E then shows end caps 74a and 74b being pulled away from pins 71 by pulling pins 71 in directions 79a and 79b, respectively. Pins 71 may be pulled by grasping eyebolts 72. At this point, sheave nest 24 is separable from the receiver 34 at the upper sheave nest aperture 47 and at upper receiver aperture 30.

Figure 13F:
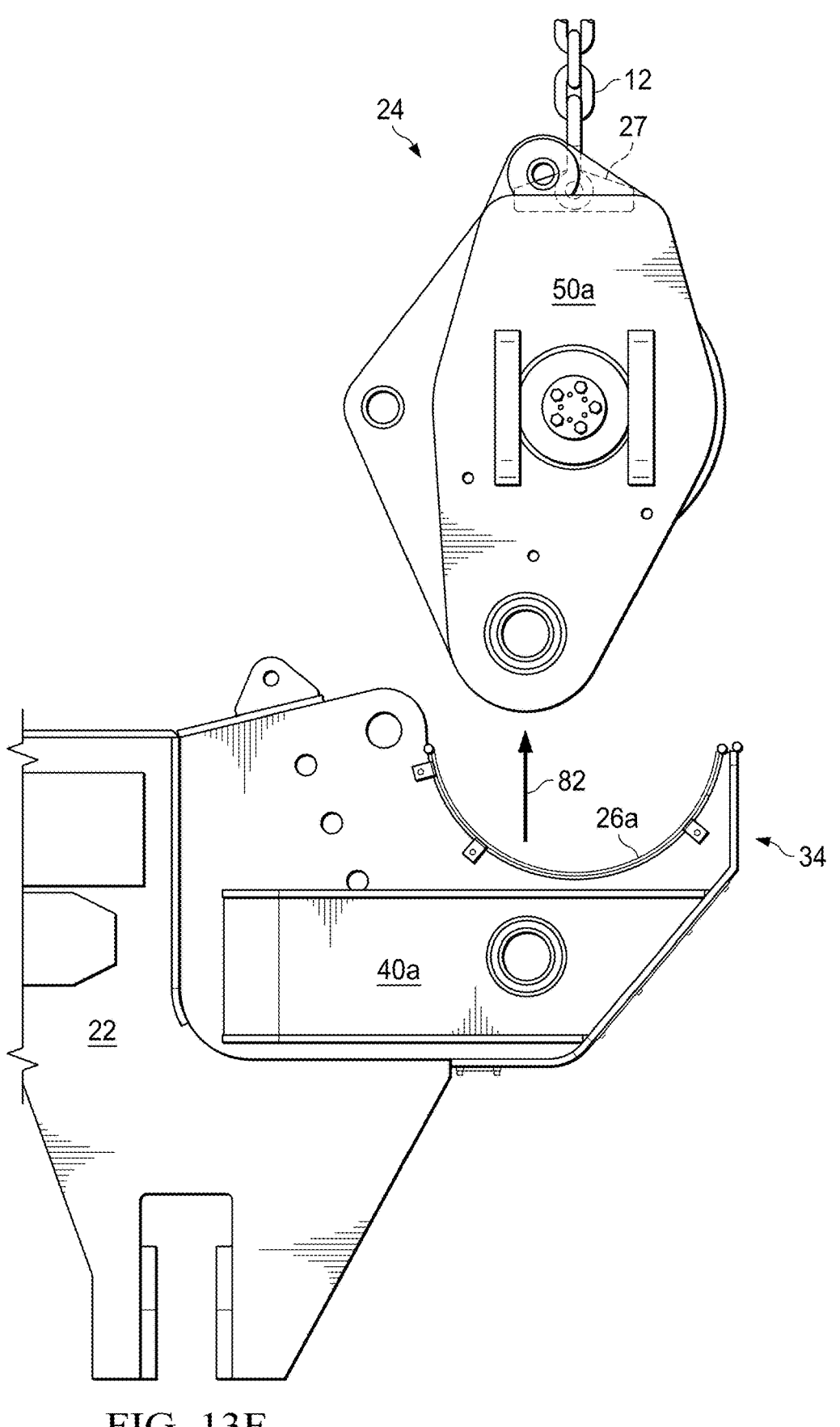
FIG. 13F (FIG. 13F) is another operational view continuing from FIG. 13E, but the respective sheave nest is removed from a receiver of the main frame of the spreader beam.

Upon such removal of the lower securement assemblies 60 and the upper securement assemblies 70, sheave nest 24 is disengaged from receiver 34 and may be removed from the receiver 34. FIG. 13F shows chain 12 attached to lifting lug 27 pulling sheave nest 24 out of receiver 34. Such pulling action is denoted by the arrow labelled 82. Chain 16 may be attached to spreader beam 20 at lifting lug 27 to hold spreader beam 20 while sheave nest 24 is pulled out of receiver 34.

Figure 13G:
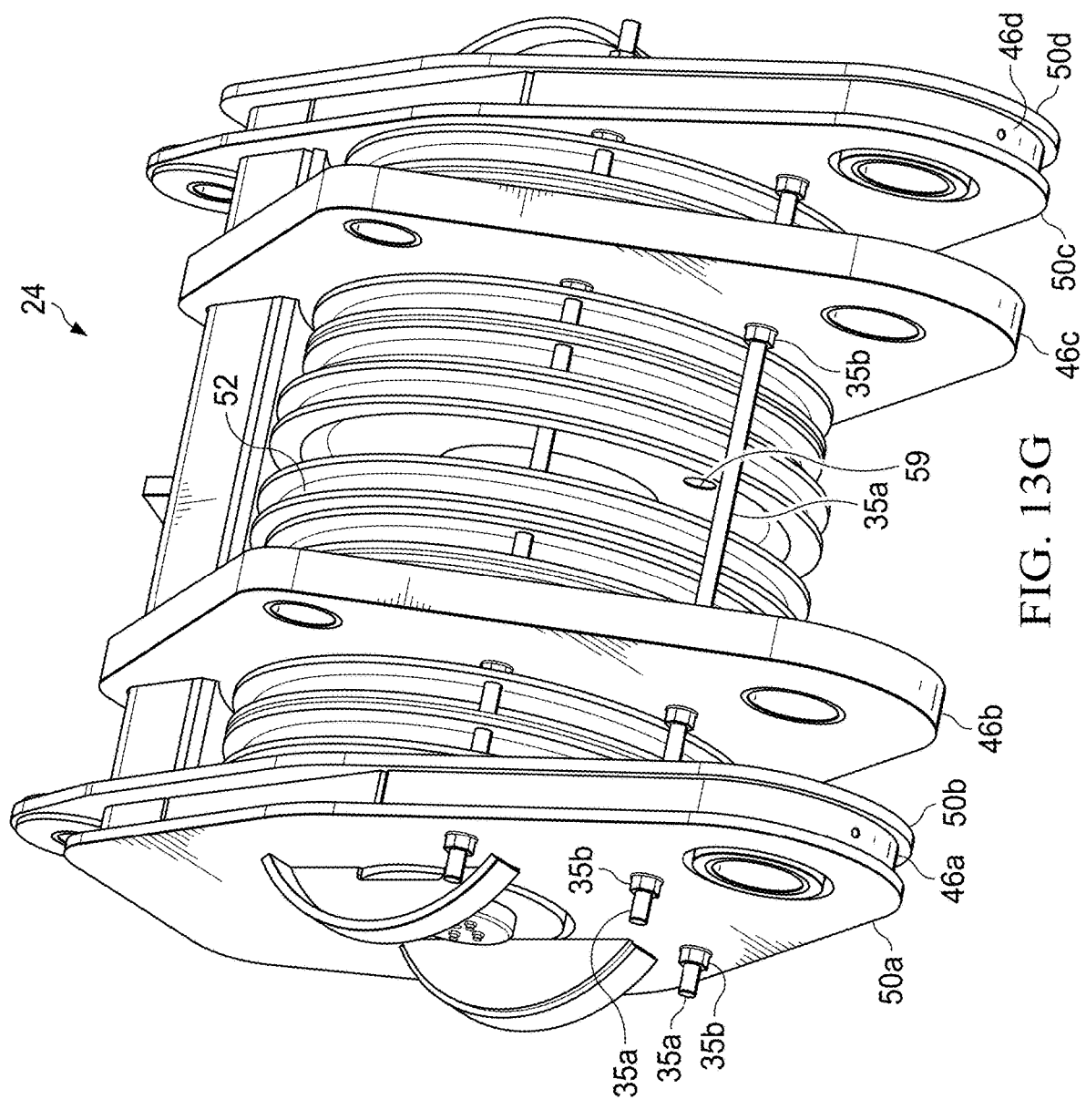
FIG. 13G (FIG. 13G) is a bottom, front, right side perspective view of a sheave nest of the spreader beam shown in FIG. 8.

Referring to FIGS. 9 and 13G, following removal of sheave nest 24 out of receiver 34, sheave nest 24 may have at least one shipping bolt 35a, inserted through holes 39 and through at least one hole 59 in or through at least one sheave 52, or at least one hole 39 below at least one sheave 52 to prevent separation of such at least one sheave 52 from sheave nest 24 and/or to prevent rotation of such at least one sheave 52 during shipping, for example, to a repair or rebuilding facility. The at least one shipping bolt 35a is secured with at least one shipping nut 35b.

At this point, a new, rebuilt, or repaired sheave nest 24 is then inserted into receiver 34. In this exemplary embodiment or another exemplary embodiment, reassembly is effected by reversing the steps in the preceding paragraphs relating to, and depicted in, FIGS. 13A through 13G.

A sheave nest 24 may be rebuilt or repaired by removing and replacing at least one sheave 52. Referring to FIGS. 9 and 13A, to remove at least one sheave 52, axle 54 is loosened and removed by loosening and removing axle bolts 54b from axle 54. Then, axle 54 is removed from sheave nest 24 by pulling on axle cap 54a. This operation is similar to that depicted in FIGS. 13B and 13C. Axle cap protectors 55 may be required to be removed prior to the removal of axle 54.

Figure 14A:
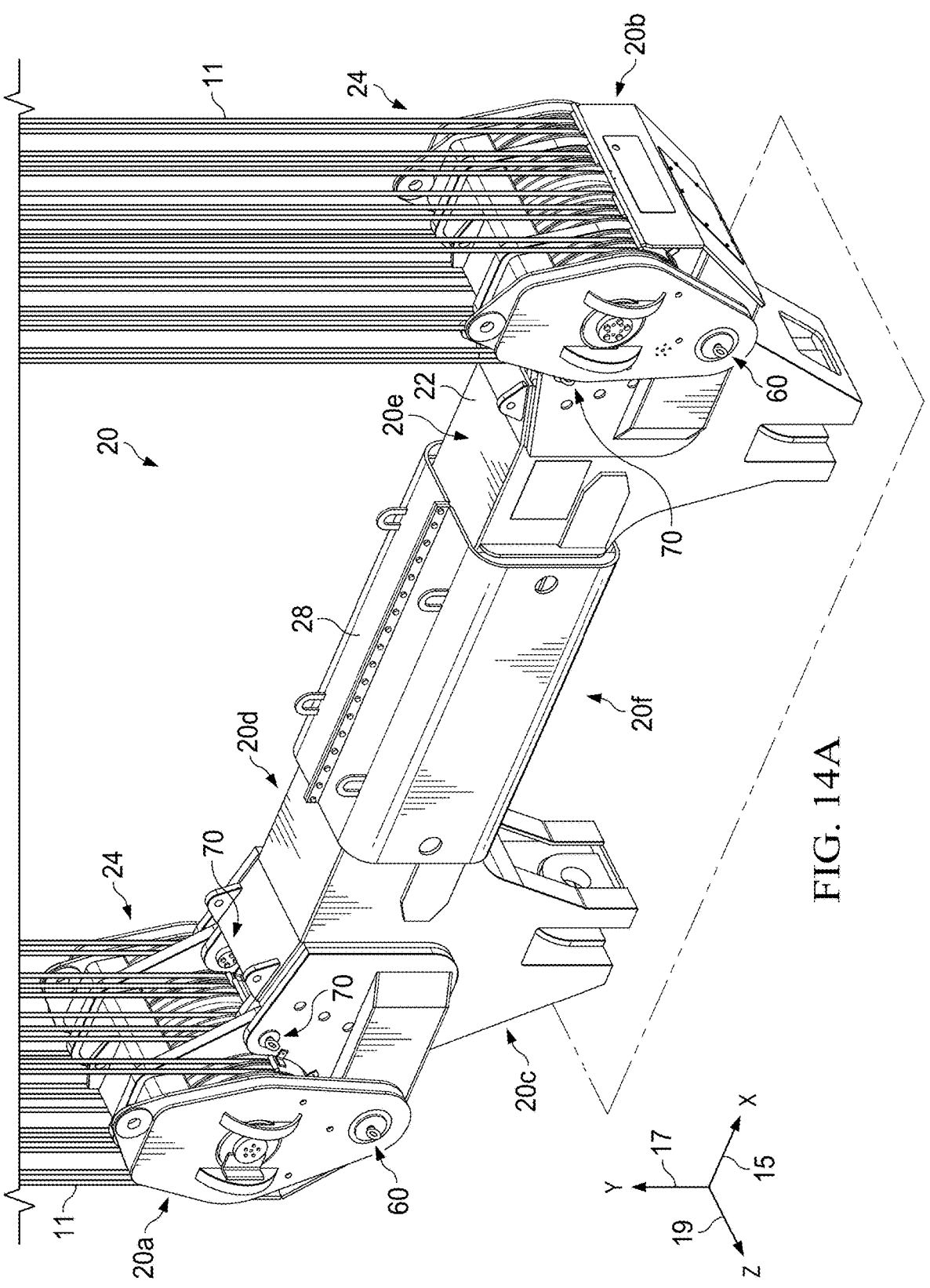
FIG. 14A (FIG. 14A) is a perspective view of a spreader beam in accordance with one aspect of the present disclosure, wherein the spreader beam is ready to be disassembled.

FIG. 14A, together with the figures that follow, depict a method of reconditioning, that is repairing or rebuilding, a spreader beam 20. In this view, and throughout the method depicted by FIGS. 14A through 18C, it is noted that suspension cables 11 remain affixed to the crane 10 or other upper support, as also shown in FIG. 1. That is, cables 11 remain in, or are held in, substantially the same configuration during the disassembly and reassembly of spreader beam 20 as during operation of spreader beam 20. This method of removing sheave nests 24 and sheaves 52 is accomplished without the need to fully unwind the suspension cables 11, thereby saving time and cost to rebuild or repair sheaves 52 and/or sheave nests 24.

Figure 14B:
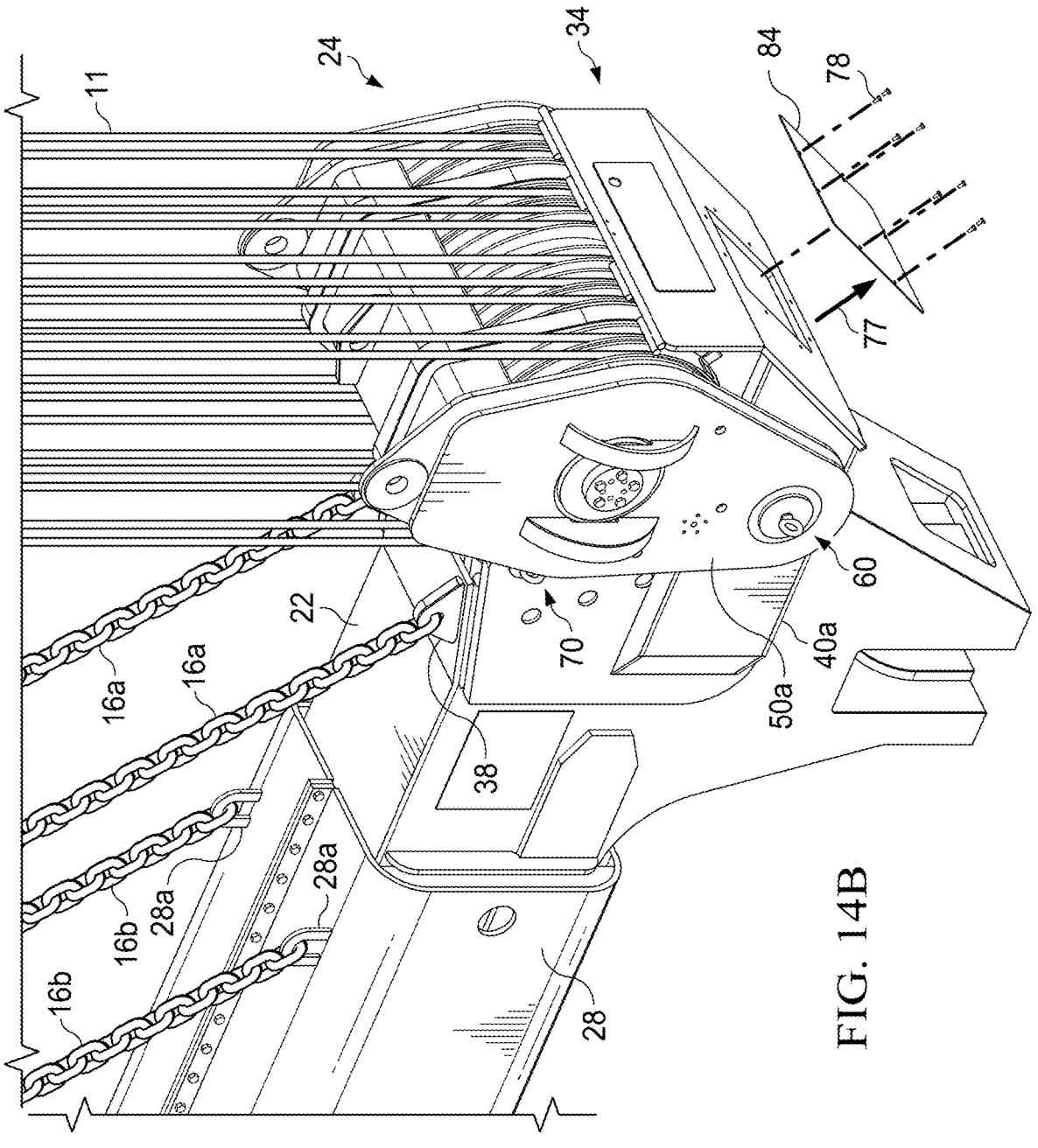
FIG. 14B (FIG. 14B) is a perspective view of a spreader beam in accordance with one aspect of the present disclosure, with an expanded view of portions of the spreader beam most involved in rebuilding.

Spreader beam 20 may be placed on the ground or other stable surface (as denoted by a dashed-dot-dot line in FIG. 14A) in preparation for removal of the sheave nests 24 from main frame 22. Prior to placing spreader beam 20 on the ground, any load or cargo that spreader beam 20 was carrying (for example ladle 14 from FIG. 1), is removed. Alternatively, spreader beam 20 can be stabilized or supported by one or more securement members such as chains 16a and/or chains 16b, or any manner other than that by which suspension cables 11 are engaged with sheaves 52 (see FIG. 14B). For example, chains 16a may be engaged with lifting lug 38, or chains 16b may be engaged with belly band loops 28a (FIG. 14B). Such support is in anticipation of pulling sheave nests 24 out of spreader beam 20. At this point, suspension cables 11 remain engaged with sheaves 52 while sheaves 52 remain engaged with sheave nests 24.

FIG. 14B depicts the operation where sheave nest 24 is to be removed from receiver 34. While only one end of spreader beam 20 is shown in FIG. 14B, it will be appreciated that the same operations will be undertaken on the other end of spreader beam 20. Cover plate 84, which is removably engaged with distal wall 34f (shown in FIGS. 13A and 13B), is pulled in direction 77 (such action is denoted by an arrow labeled 77) after removing at least one fastener 78, for example, a bolt, from cover plate 84.

Figure 15A:
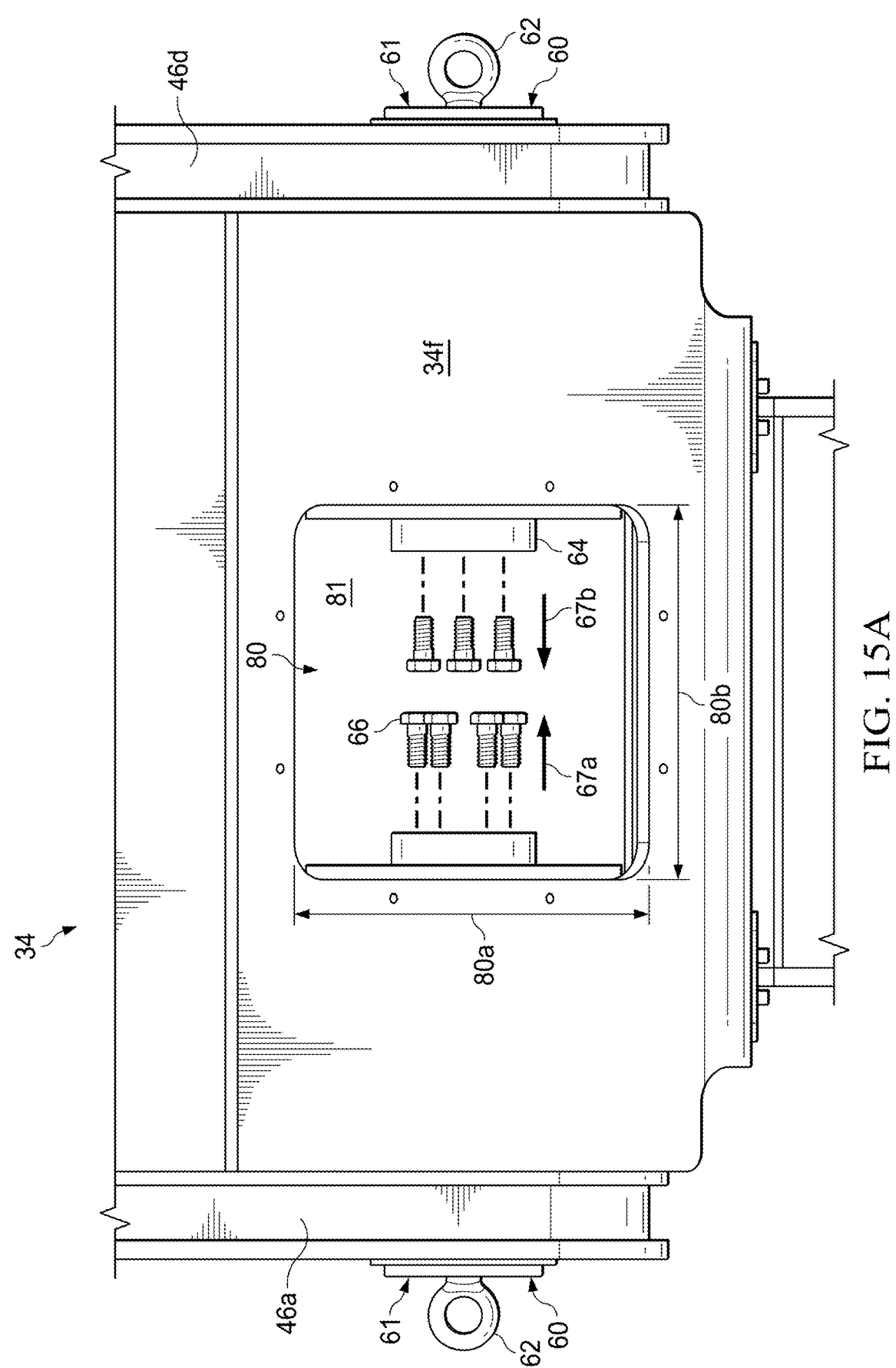
FIG. 15A (FIG. 15A) is an operational view wherein a cover plate of the spreader beam is removed from the main frame and but fasteners of the lower securement assemblies are loosened and removed from pins and the end caps of the lower securement assemblies.

FIG. 15A shows the end view of receiver 34 after cover plate 84 is removed to reveal access port 80. In this exemplary embodiment or another exemplary embodiment, access port 80 provides access to the lower securement assemblies 60, including pins 61, end caps 64, and fasteners 66, which are located in chamber 81. Lower securement assemblies 60 and upper securement assemblies 70 are loosened and removed from sheave nest 24 and receiver 34.

Figure 15B:
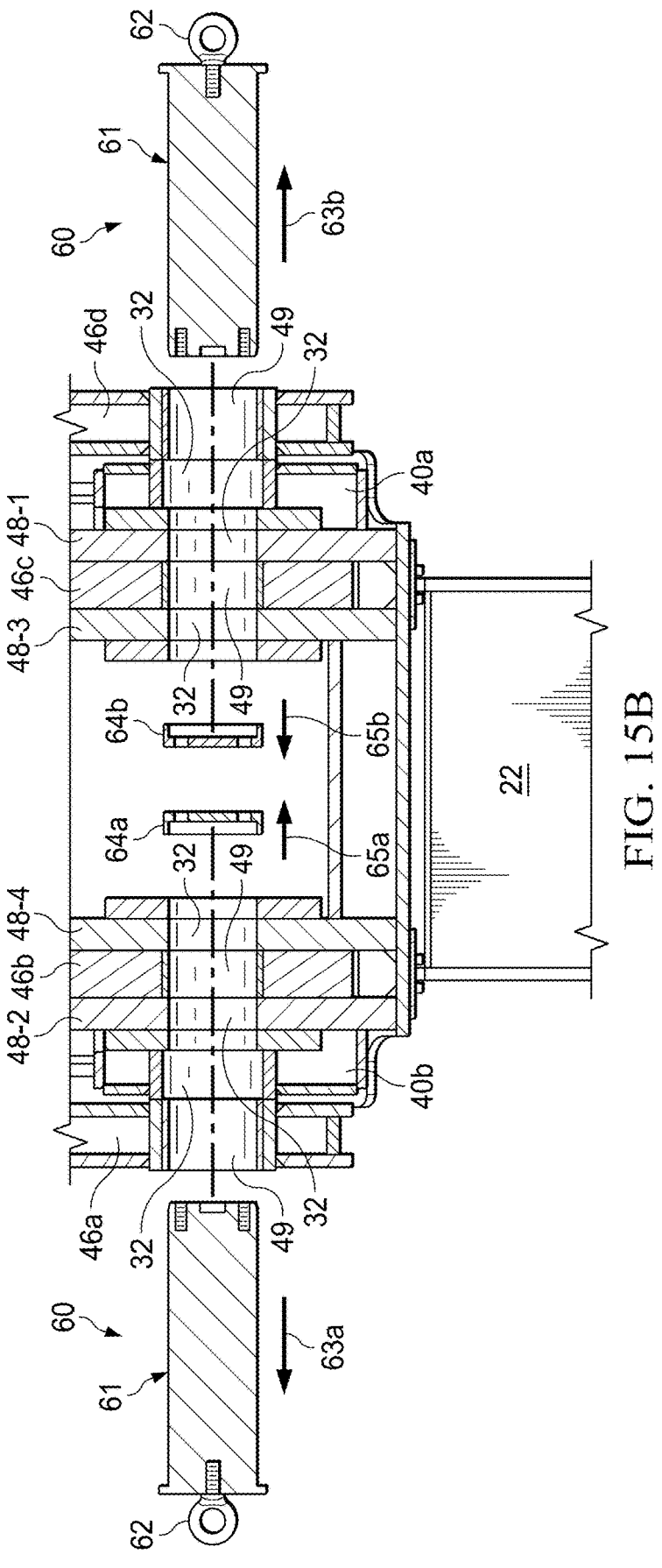
FIG. 15B (FIG. 15B) is an operational view similar to FIG. 15A, but the pins and the end caps of the lower securement assemblies are disengaged from one another and removed from the main frame and respective sheave nest.

Referring to FIG. 15A, to continue the removal of sheave nest 24 from receiver 34, fasteners 66 are moved in directions 67a and 67b to disengage them from pins 61 and end caps 64. In this operation, fasteners 66 are simply loosened and/or unscrewed from pins 61 by a tool or device that may apply torque on said fasteners 66. In FIG. 15B, it is seen that end caps 64a and 64b are removed from pins 61 by pulling in directions 65a and 65b respectively. Pins 61 may be pulled by grasping eye bolts 62. Pins 61 are pulled in directions 63a and 63b, respectively. At this point, sheave nest 24 is separable from the receiver 34 at the lower sheave nest aperture 49 and at the lower receiver aperture 32.

Figure 15C:
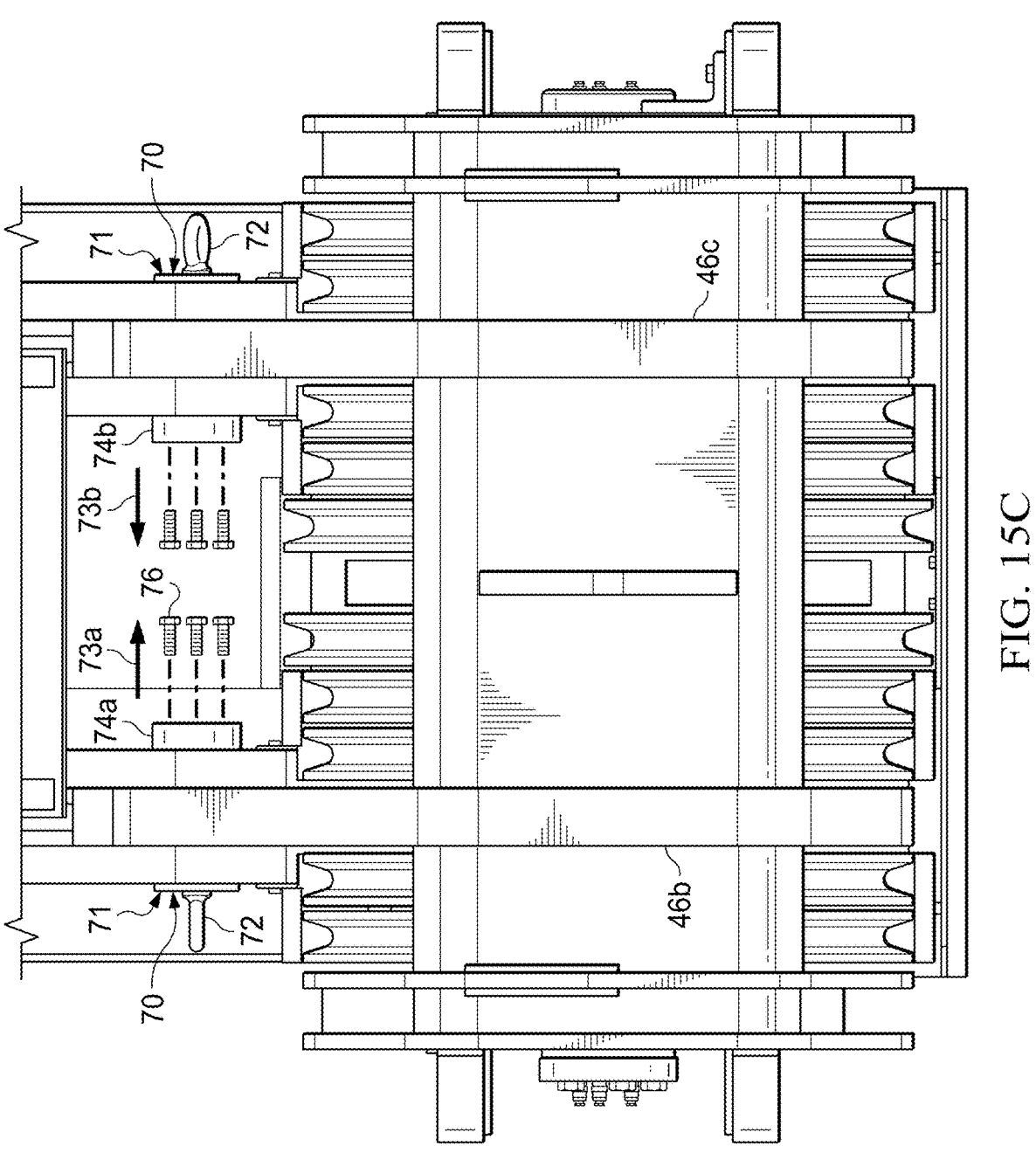
FIG. 15C (FIG. 15C) is an operational view of a sheave nest and another portion of the spreader beam, wherein fasteners of upper securement assemblies are being loosened and removed from pins and the end caps of the upper securement assemblies.
Figure 15D:
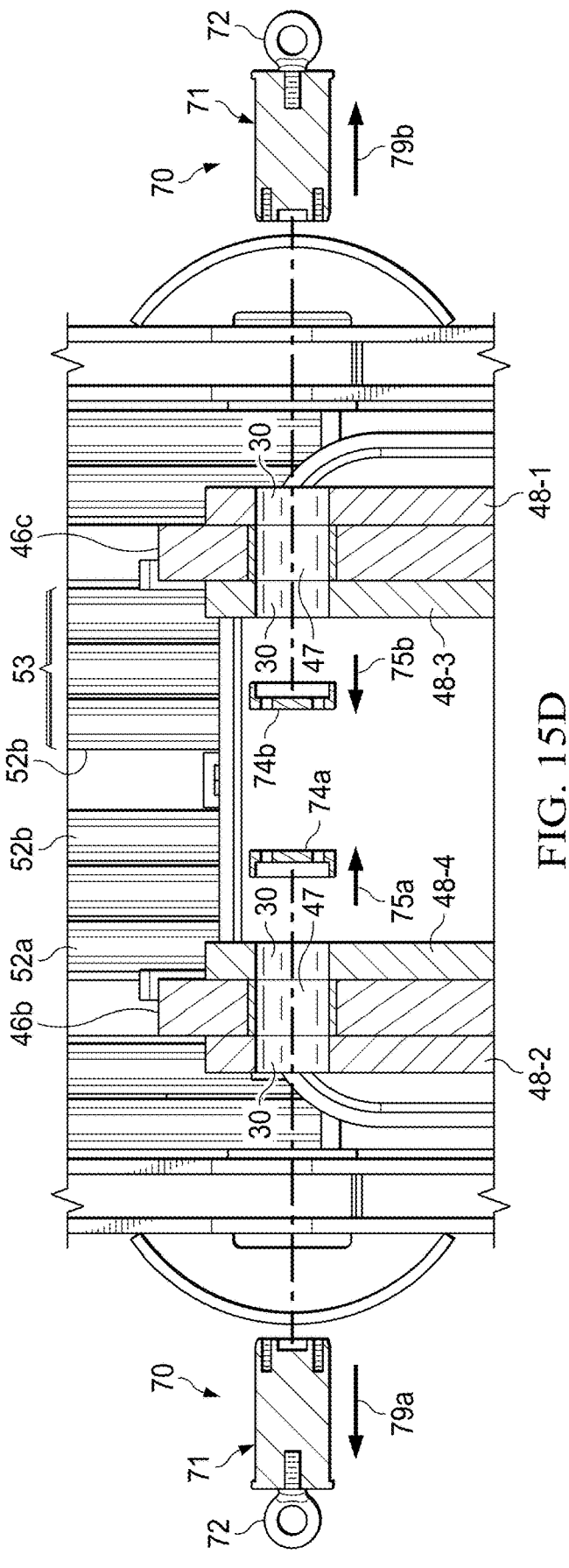
FIG. 15D (FIG. 15D) is an operational view similar to FIG. 15C, where the pins and the end caps of the upper securement assemblies are disengaged from one another and removed from the main frame and respective sheave nest.

Once the lower securement assemblies 60 are removed from the sheave nest 24 and the receiver 34, the operations of removing the upper securement assemblies 70 from the sheave nest 24 and receiver 34 are next undertaken. FIG. 15C shows the removal of fasteners 76 from pins 71 and end caps 74 by unscrewing the fasteners 76 from the pins 71 and end caps 74 and pulling in directions 73a or 73b as appropriate. FIG. 15D shows end caps 74a and 74b being pulled away from pins 71 by pulling pins 71 in directions 79a and 79b, respectively. Pins 71 may be pulled by grasping eyebolts 72. At this point, sheave nest 24 is separable from the receiver 34 at the upper sheave nest aperture 47 and at upper receiver aperture 30.

Figure 16A:
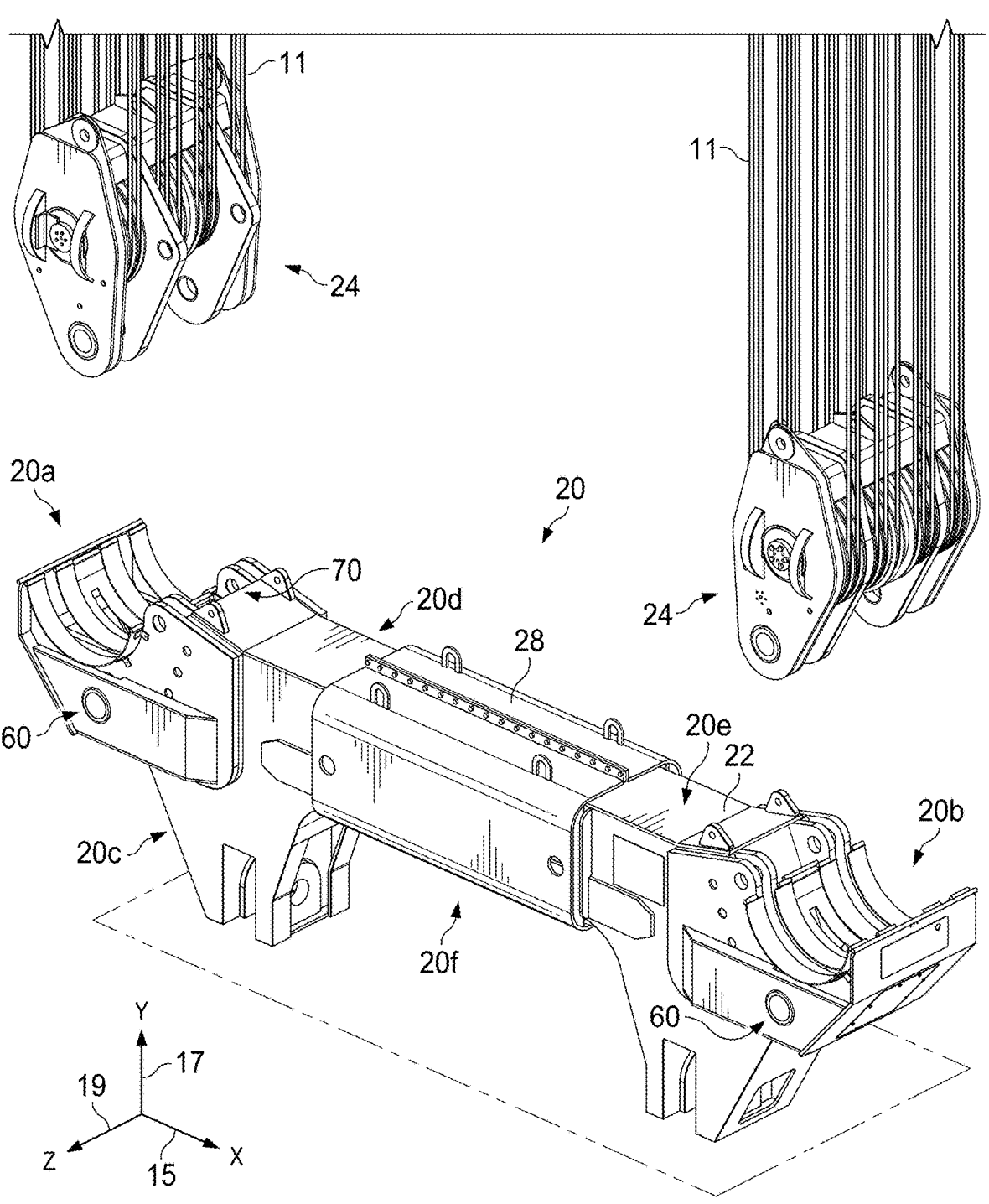
FIG. 16A (FIG. 16A) is a top, front, right side perspective view of a spreader beam with sheave nests removed and suspended by suspension cables.
Figure 16B:
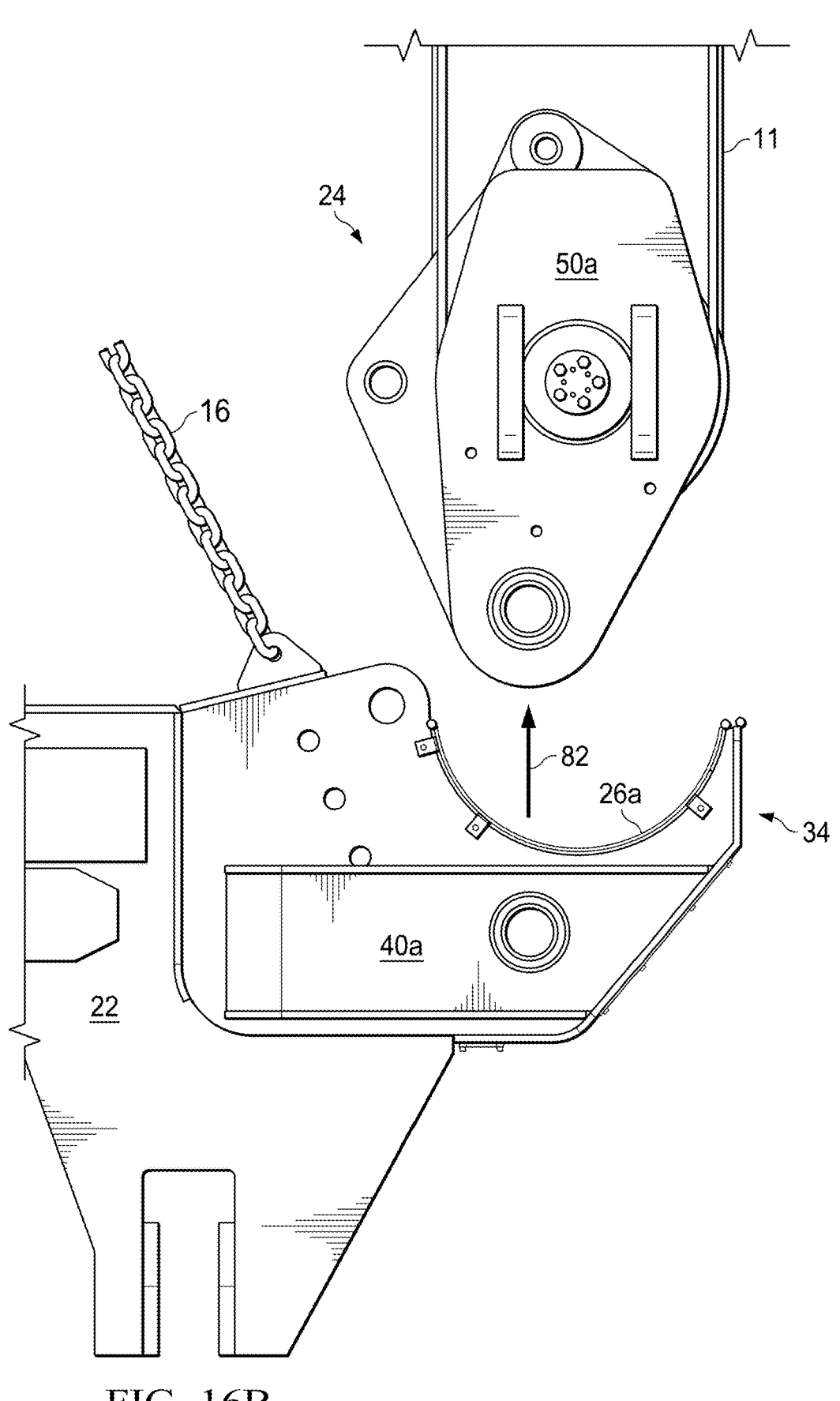
FIG. 16B (FIG. 16B) is an expanded view of a sheave nest being removed from a receiver while suspended by suspension cables.

Upon removal of the lower securement assemblies 60 and the upper securement assemblies 70, sheave nest 24 is disengaged from receiver 34 and may be removed from the receiver 34. FIGS. 16A and 16B show that suspension cables 11 remain engaged with sheaves 52 when pulling sheave nests 24 out of receivers 34. Such pulling action is denoted by the arrow labelled 82 in FIG. 16B. The foregoing represents an exemplary embodiment. Another exemplary embodiment (not shown) envisions pulling sheaves 52 out of sheave nests 24 prior to pulling sheave nests 24 out of receivers 34.

Figure 17A:
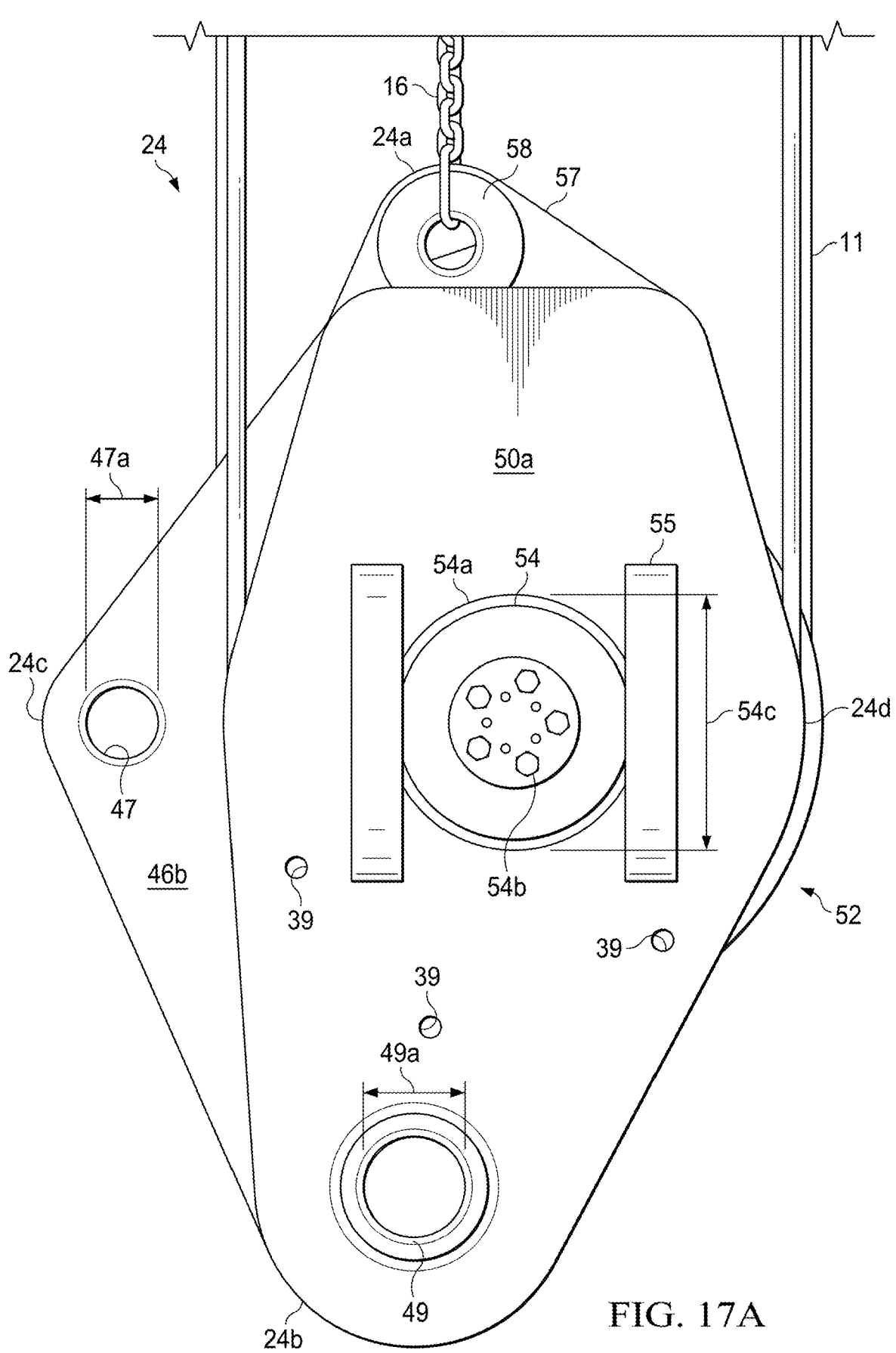
FIG. 17A (FIG. 17A) is an expanded view of a sheave nest after removal from a receiver while suspended by suspension cables and preparing to lift the sheave nest out of the sheaves.
Figure 17B:
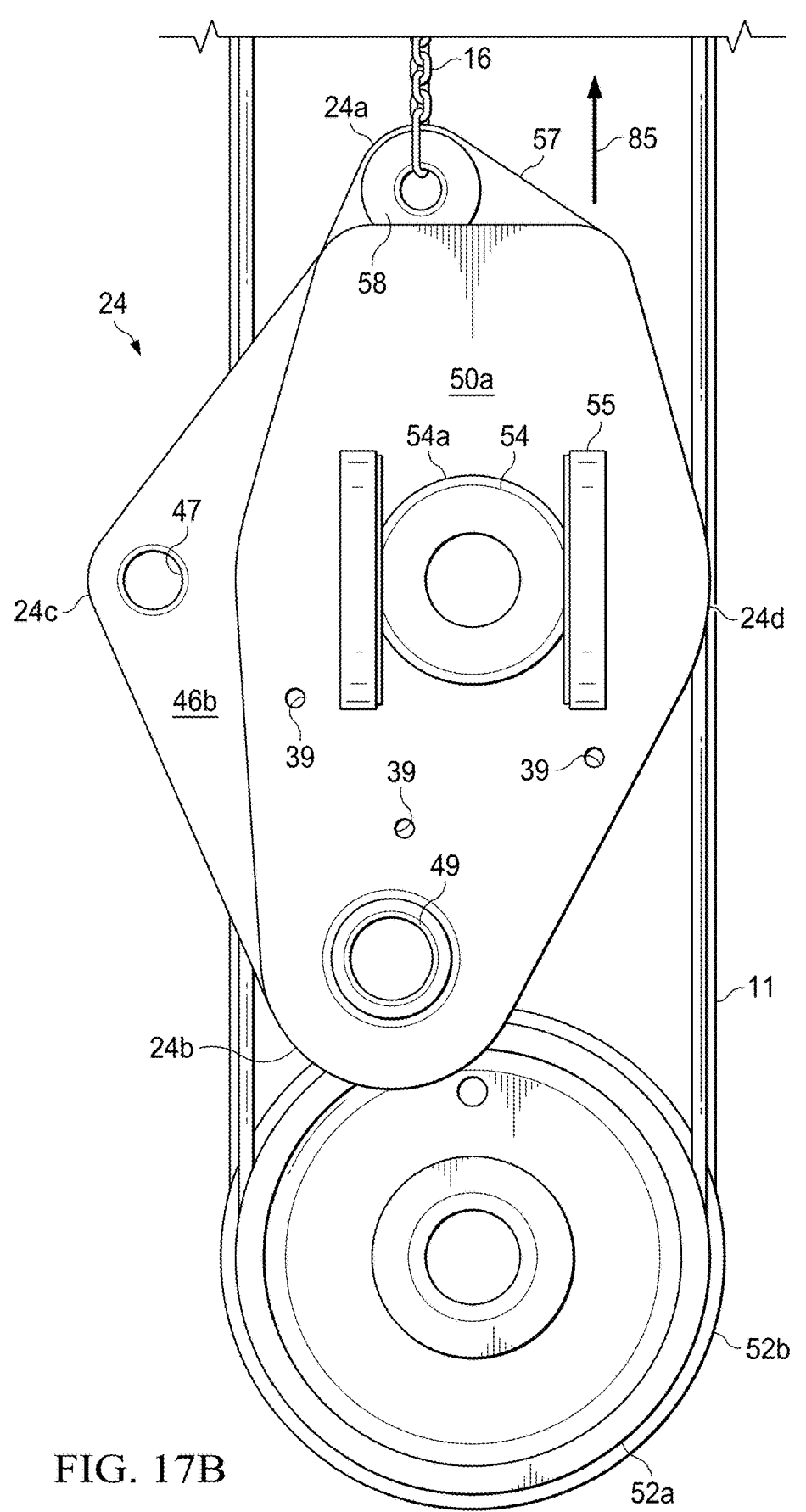
FIG. 17B (FIG. 17B) is an operational view similar to that in FIG. 17A, with the sheave nest being pulled out and removed from the sheaves.

Referring to FIGS. 17A and 17B, following removal of sheave nest 24 from receiver 34, sheave nest 24 may be removed from (pulled out of) sheaves 52. Such pulling motion is indicated by the arrow labelled 85. In such step, sheave nest 24 may be supported with a securement member such as chain 16 that is engaged with lifting lug 57 of sheave nest 24. After sheave nest 24 is removed from receiver 34, while still suspended by chain 16, the sheave nest 24 is removed from the sheaves 52 (see FIG. 17B). To remove sheave nest 24 from the sheaves 52 while the sheaves 52 are still suspended in suspension cables 11, axle 54 is loosened and removed by loosening and removing axle bolts 54b from axle 54. Then, axle 54 is removed from sheave nest 24 by pulling on axle cap 54a. This operation is similar to that depicted in FIGS. 13B and 13C. Axle cap protectors 55 may be removed prior to the removal of axle 54.

Figure 18A:
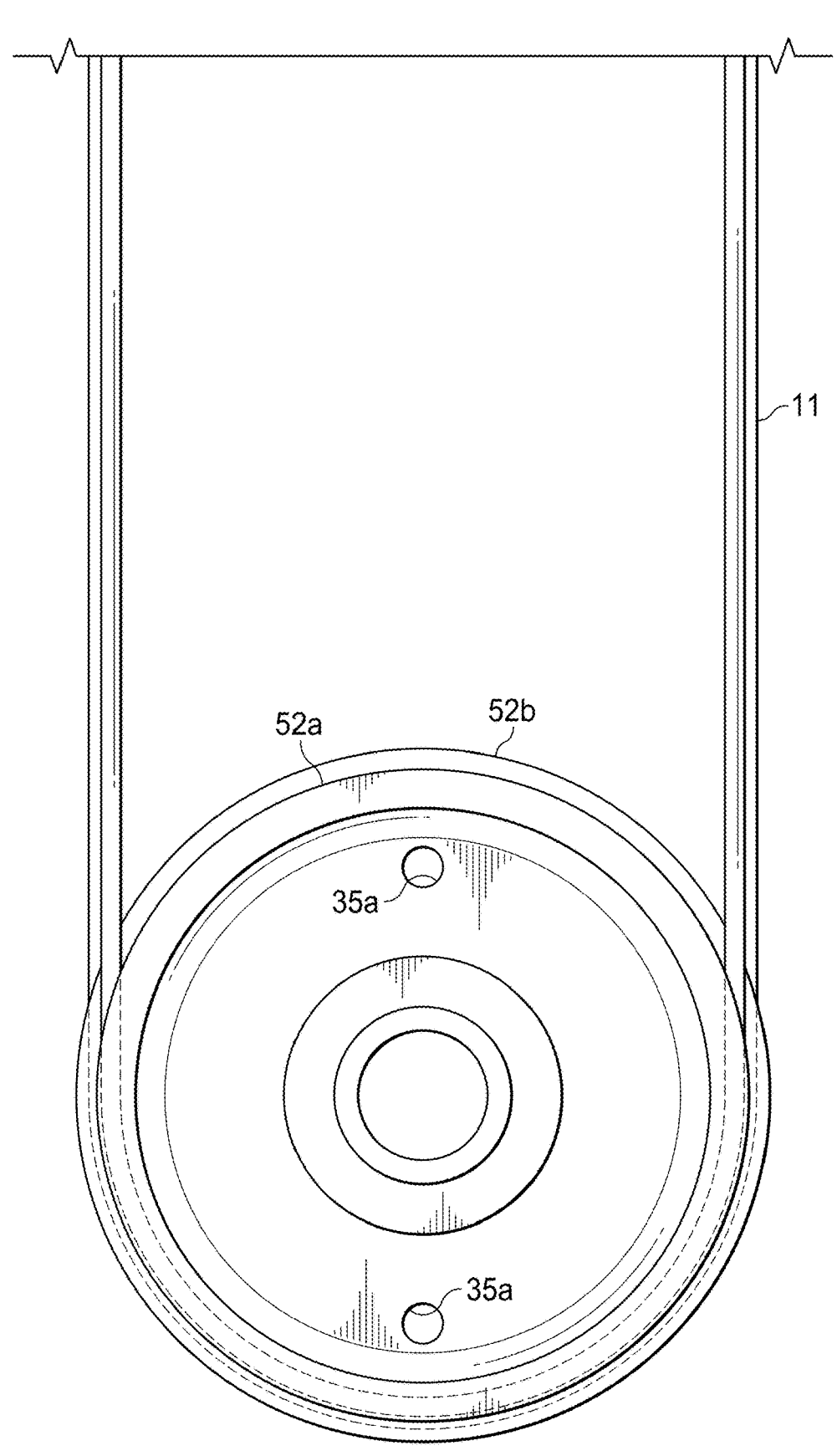
FIG. 18A (FIG. 18A) is a side elevation view of sheaves removed from a sheave nest and suspended in suspension cables.
Figure 18B:
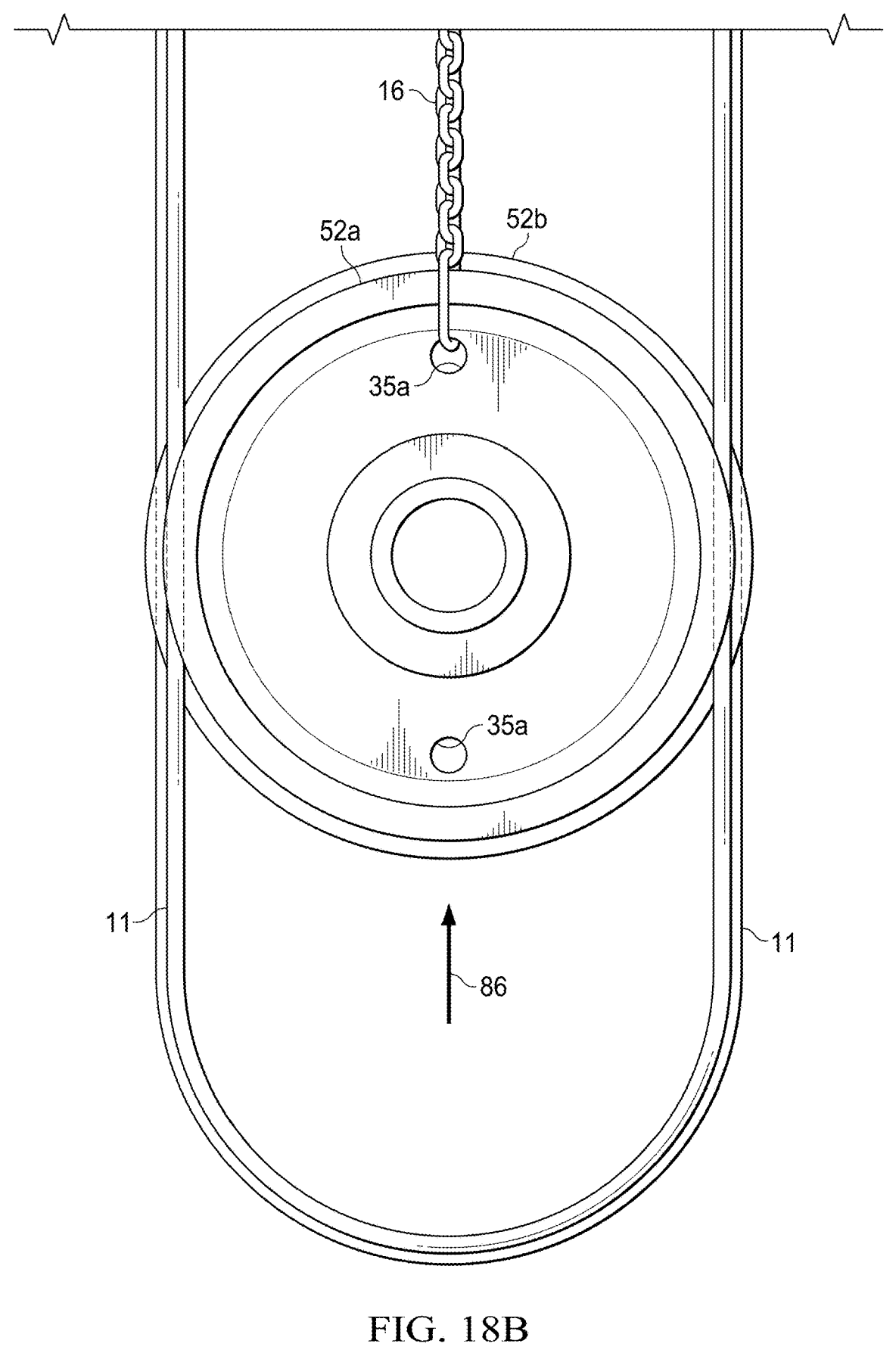
Figure 18C:
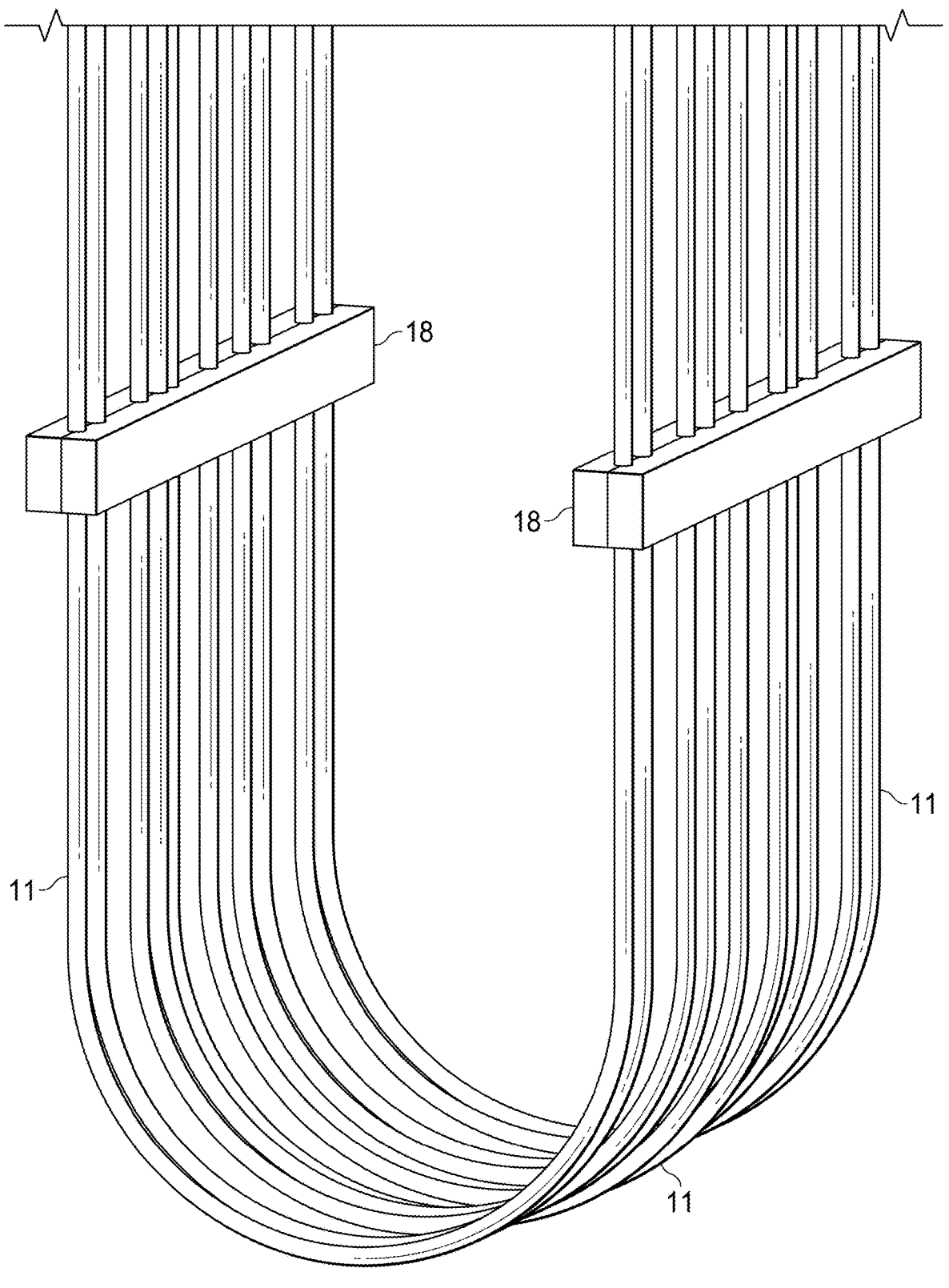
FIG. 18C (FIG. 18C) is a perspective view of the suspension cables remaining substantially in operating configuration after sheaves are removed, wherein clamps are engaged with the suspension cables to maintain the suspension cables at the operating orientation.

FIG. 18A shows sheaves 52 suspended on suspension cables 11 after sheave nest 24 is separated from sheaves 52. FIG. 18B depicts the sheaves 52 being removed from suspension cables 11. Sheaves 52 may be pulled out of suspension cables 11 by a chain 16, a cable, or other similar components that may secure to sheaves 52 for removing such sheaves 52 from suspension cables 11. Such pulling motion is indicated by the arrow labelled 86. FIG. 18C shows suspension cables 11 with all elements under discussion (spreader beam 20, sheave nests 24 and sheaves 52) removed.

FIG. 18C also shows optional clamps 18 attached to or engaged with suspension cables 11. Clamps 18 are designed to surround and secure a plurality of cables in a desired configuration. Clamps 18 may hold suspension cables 11 together, anywhere along a substantially straight and vertical portion of suspension cables 11, or in one embodiment as close to the bottom of such cables as will allow the removal and reinstallation of sheave nests 24 and sheaves 52 to suspension cables 11. In this way, suspension cables 11 are maintained in substantially the same configuration as during operation of spreader beam 20. It will be appreciated that, in one embodiment, one spreader beam 20 includes two ends, that is, two sheave nests 24 and two pluralities of sheaves 52, as well as two pluralities of suspension cables 11, (see FIGS. 14A and 16A). Other configurations are possible. FIGS. 16B through 18B depict one such sheave nest 24 and one plurality of sheaves 52 held by one plurality of suspension cables 11. FIG. 18C depicts one plurality of suspension cables 11 after all portions of spreader beam 20 have been removed.

Through use of clamps 18, suspension cables 11 are maintained in substantially the same configuration as when engaged with sheaves 52 or in the fully operational configuration as shown in FIG. 1 or FIG. 14A. That is, as best shown in FIG. 18C, suspension cables 11 remain "parallel" to one another, while maintaining an arcuate configuration at their bottom, which is the portion previously engaged with sheaves 53. In this context, "parallel" means that the suspension cables remain spaced apart and substantially in the same configuration as during operation of the spreader beam 20. While only two suspension cables 11 are shown in FIGS. 18A and 18B, it will be appreciated that any number of suspension cables 11 may be present. In FIG. 18C, and as in earlier figures, ten suspension cables 11 are shown in a substantially "parallel" configuration as previously engaged with a corresponding sheave nest 24.

To reassemble or recondition spreader beam 20, new or rebuilt sheaves 52 and/or new or rebuilt sheave nests 24 are installed to spreader beam 20. In one example, such old or original sheaves 52 that were installed with sheave nests 24 may be referred to herein as first and second pluralities of sheaves while the new, rebuilt, or repaired sheaves 52 that reinstalled with sheave nests 24 may be referred to herein as third and fourth pluralities of sheaves 52 to differentiate such sheaves 52. Generally, this may be accomplished by reversing the steps depicted in FIGS. 14A through 18C, with the exception that clamps 18 are removed as the final step of reassembly.

During this entire reassembly process, suspension cables 11 remain in substantially their operating orientation, that is, substantially parallel and having an arcuate configuration. Once sheaves are installed to suspension cables 11, suspension cables 11 remain engaged with sheaves 52. Finally, clamps 18 are removed from suspension cables 11.

In further detail, to begin the rebuilding of spreader beam 20, new, rebuilt or reconditioned sheaves 52 are positioned to be suspended in suspension cables 11 (FIG. 18A). At this step, the clamps 18 are engaged with the suspension cables 11 to maintain the spacing and/or positioning of the suspension cables 11 that match with the spacing of the sheaves 52. It should be noted that if clamps 18 are not used, operators may simply place and/or align each suspension cable 11 with the respective sheave 52 prior to a respective sheave nest 24 being engaged therewith. Next, sheaves 52 receive sheave nests 24 (FIG. 17B). Then, axle 54 and axle cap 54a are installed to sheave nest 24 and sheaves 52. Axle bolts 54b are inserted and tightened. Sheave nests 24 are then inserted into receivers 34. Lower securement assembly 60 and upper securement assembly 70 then are engaged with sheave nest 24 and receivers 34.

In particular, lower sheave nest apertures 49 of the at least one sheave nest 24 are positioned to be coaxial with the lower receiver apertures 32 of the at least one receiver 34 in order to engage the at least one sheave nest 24 with the at least one receiver 34. Further, upper receiver apertures 30 are positioned to be coaxial with the upper sheave nest apertures 47 in order to engage the at least one sheave nest 24 with the at least one receiver 34. The actions in the preceding two sentences are shown in FIGS. 17A and 16B.

Lastly, irrespective of the order in which sheaves 52 and sheave nests 24 are reassembled to one another, or to suspension cables 11, clamps 18 are removed from the plurality of suspension cables 11 to result in a rebuilt and/or reconditioned spreader beam ready for operation.

The method above may be accomplished without unwinding the suspension cables 11 from the spreader beam 20 or refeeding the suspension cables 11 into the spreader beam 20 as they may remain suspended from above, engaged with a crane, or otherwise supported. This advantage greatly reduces the time and cost to rebuild a spreader beam.

It should be understood herein that chains 16 may simply be any restraint or similar elements of the like for restraining any component of the spreader beam 20, including main frame 22, at least one sheave nest 24, and at least one plurality or set of sheaves 52. As such, chains 16 and similar elements of the like disclosed herein may be referred to herein as restraints or restraining members.

Figure 19:
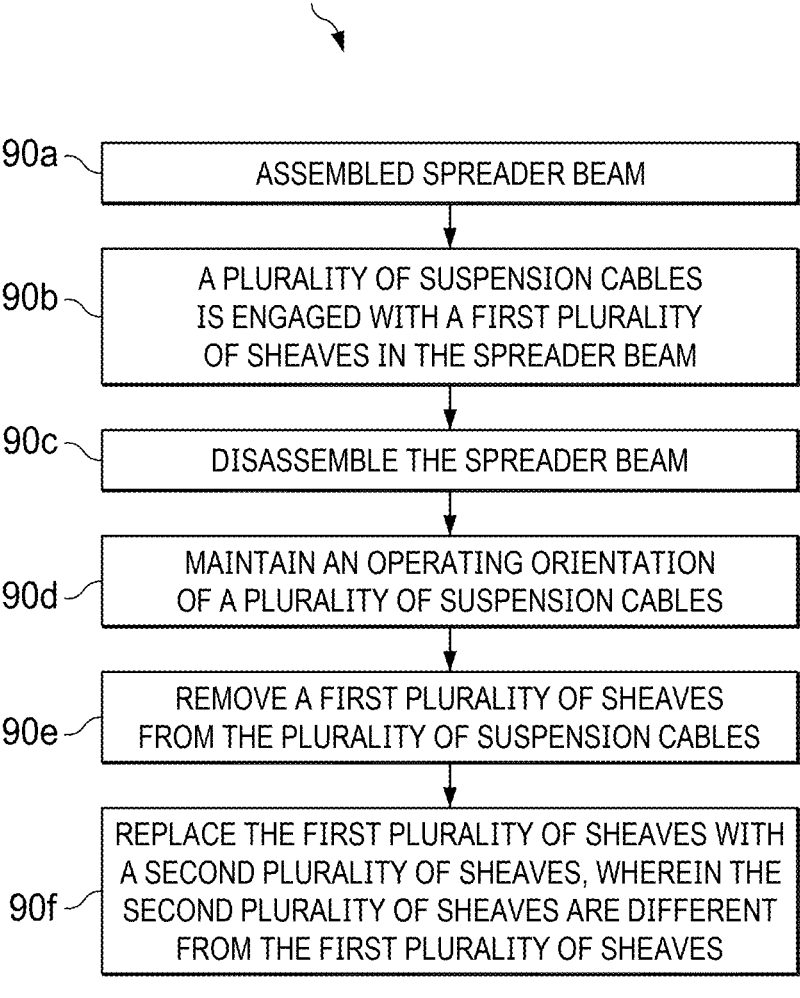
FIG. 19 (FIG. 19) is a method flowchart of reconditioning a spreader beam.

FIG. 19 provides a flowchart representing a disclosed method 90 of reconditioning a spreader beam, which substantially discloses the following steps:

A method of reconditioning a spreader beam comprising:

90a—starting with an assembled spreader beam:

90b—wherein a plurality of suspension cables is engaged with a first plurality of sheaves of the spreader beam;

90c—disassembling the spreader beam;

90d—maintaining an operating orientation of a plurality of suspension cables;

90e—removing the first plurality of sheaves from the plurality of suspension cables; and

90f—and replacing the first plurality of sheaves with a second plurality of sheaves, wherein the second plurality of sheaves are different from the first plurality of sheaves.

Various inventive concepts may be embodied as one or more methods, of which an example has been provided. The acts performed as part of the method may be ordered in any suitable way. Accordingly, embodiments may be constructed in which acts are performed in an order different from illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

While components of the present disclosure are described herein in relation to each other, it is possible for one of the components disclosed herein to include inventive subject matter, if claimed alone or used alone. In keeping with the above example, if the disclosed embodiments teach the features of A and B, then there may be inventive subject matter in the combination of A and B, A alone, or B alone, unless otherwise stated herein.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different from those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

To the extent that the present disclosure has utilized the term "invention" in various titles or sections of this specification, this term was included as required by the formatting requirements of word document submissions pursuant the guidelines/requirements of the United States Patent and Trademark Office and shall not, in any manner, be considered a disavowal of any subject matter.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed is:

1. A method of reconditioning a spreader beam, the spreader beam including a main frame, a sheave nest releasably engaging the main frame, and a first plurality of sheaves releasably engaging the sheave nest, the method comprising:
   disassembling the spreader beam, the step of disassembling the spreader beam including removing the sheave nest from the main frame;
   maintaining an operating orientation of a plurality of suspension cables, wherein the plurality of suspension cables are engaged with the first plurality of sheaves of the spreader beam while the sheave nest is disassembled from the first plurality of sheaves;
   removing the sheave nest from the plurality of suspension cables; and
   reassembling the spreader beam using a new, rebuilt, or repaired sheave nest, the spreader beam receiving the new, rebuilt, or repaired sheave nest therein.

2. The method of claim 1, wherein the step of maintaining the operating orientation of the plurality of suspension cables further comprises:
   installing at least one clamp to the plurality of suspension cables at a distance away from the first plurality of sheaves.

3. The method of claim 2, further comprising:
   installing the plurality of suspension cables into the second plurality of sheaves;
   removing the at least one clamp from the plurality of suspension cables; and
   reassembling the spreader beam with the new, rebuilt, or repaired sheave nest.

4. The method of claim 1, further comprising:
   securing a plurality of restraints to the main frame; and
   stabilizing the main frame, by the plurality of restraints, as the sheave nest is disassembled from the main frame and thereby separated therefrom.

5. A method of reconditioning a spreader beam, comprising:
   disassembling the spreader beam;

maintaining an operating orientation of a plurality of suspension cables, wherein the plurality of suspension cables are engaged with a first plurality of sheaves of the spreader beam;

removing the sheave nest from the plurality of suspension cables;

reassembling the spreader beam using a new, rebuilt, or repaired sheave nest, the spreader beam receiving the new, rebuilt, or repaired sheave nest therein;

wherein the step of disassembling the spreader beam comprises:

disassembling a sheave nest of the spreader beam from a main frame of the spreader beam;

and disassembling the sheave nest from the first plurality of sheaves of the spreader beam while maintaining the operating orientation of the plurality of suspension cables;

wherein the step of disassembling the sheave nest from the main frame comprises:

removing at least a first securement assembly from the sheave nest and a receiver of the spreader beam, the first securement assembly including a first pin; and removing at least a second securement assembly from the sheave nest and the receiver, the second securement assembly including a second pin.

6. The method of claim 5, further comprising:

removing an axle from the sheave nest and the receiver; and separating the sheave nest from the receiver.

7. The method of claim 5, further comprising:

removing a cover plate from the receiver;

revealing an access port defined in the receiver; and accessing at least a portion of the first securement assembly inside a chamber defined in the receiver through the access port.

8. The method of claim 5, wherein the step of removing the at least the first securement assembly comprises:

disengaging at least one fastener from an end cap of the at least the first securement assembly;

disengaging the at least one fastener from the first pin of the first securement assembly; and separating the end cap from the first pin.

9. The method of claim 8, wherein the step of removing the at least the first securement assembly further comprises:

removing the pin from a first sheave nest and the receiver.

10. The method of claim 9, further comprising:

removing at least a second securement assembly from at least the first sheave nest and the receiver.

11. A method of reconditioning a spreader beam, the spreader beam including a main frame, a sheave nest releasably engaged with the main frame, and a first plurality of sheaves releasably engaged with the sheave nest, comprising:

disassembling the sheave nest from the main frame;

maintaining an operating orientation of a plurality of suspension cables, wherein the plurality of suspension cables are engaged with the first plurality of sheaves of the spreader beam;

disassembling the sheave nest from the first plurality of sheaves while the first plurality of sheaves engages the plurality of suspension cables and while maintaining the operating orientation of a plurality of suspension cables;

removing the sheave nest from the plurality of suspension cables; and reassembling the spreader beam using a new, rebuilt, or repaired sheave nest, the spreader beam receiving the new, rebuilt, or repaired sheave nest therein.

12. The method of claim 11, further comprising:

securing a plurality of restraints to the main frame; and stabilizing the main frame, by the plurality of restraints, as the sheave nest is disassembled from the main frame and thereby separated therefrom.

* * * * *